(12) United States Patent
Shooter et al.

(10) Patent No.: US 12,435,275 B2
(45) Date of Patent: Oct. 7, 2025

(54) AROMATIC AMIDE DISPERSANT

(71) Applicant: Lubrizol Advanced Materials, Inc., Cleveland, OH (US)

(72) Inventors: Andrew J. Shooter, Wilmslow (GB); Conor Wilkinson, Manchester (GB); Shabana Rafiq, Manchester (GB)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 1000 days.

(21) Appl. No.: 17/269,600

(22) PCT Filed: Aug. 21, 2019

(86) PCT No.: PCT/US2019/047448
§ 371 (c)(1),
(2) Date: Feb. 19, 2021

(87) PCT Pub. No.: WO2020/041433
PCT Pub. Date: Feb. 27, 2020

(65) Prior Publication Data
US 2021/0238433 A1 Aug. 5, 2021

Related U.S. Application Data

(60) Provisional application No. 62/721,320, filed on Aug. 22, 2018.

(51) Int. Cl.
| | | |
|---|---|---|
| *C09K 23/22* | (2022.01) | |
| *C08G 65/333* | (2006.01) | |
| *C09D 11/033* | (2014.01) | |
| *C09D 11/037* | (2014.01) | |
| *C09D 11/104* | (2014.01) | |
| *C09D 11/322* | (2014.01) | |
| *C09D 17/00* | (2006.01) | |

(52) U.S. Cl.
CPC ........ *C09K 23/22* (2022.01); *C08G 65/33396* (2013.01); *C09D 11/033* (2013.01); *C09D 11/037* (2013.01); *C09D 11/104* (2013.01); *C09D 11/322* (2013.01); *C09D 17/001* (2013.01); *C09D 17/002* (2013.01)

(58) Field of Classification Search
CPC .............. C09K 23/22; C08G 65/33396; C09D 11/033; C09D 11/037; C09D 11/104; C09D 11/322; C09D 17/001; C09D 17/002
See application file for complete search history.

(56) References Cited

U.S. PATENT DOCUMENTS

2015/0148476 A1* 5/2015 Thetford .......... C08G 65/33341
525/50
2021/0198500 A1* 7/2021 Shooter .................... C09D 7/45

FOREIGN PATENT DOCUMENTS

WO 2008028954 A2 3/2008

OTHER PUBLICATIONS

PCT Written Opinion of the International Searching Authority, Dec. 4, 2019.
PCT International Search Report, Dec. 4, 2019.

* cited by examiner

*Primary Examiner* — Angela C Scott
(74) *Attorney, Agent, or Firm* — Vincent A. Cortese; Samuel B. Laferty; Michael A. Miller

(57) ABSTRACT

The present invention relates to a polymeric aromatic amide dispersant, and a composition containing a particulate solid, an aqueous or polar organic medium, and a polymeric aromatic amide dispersant having at least one tertiary amide linking group connecting through a carbonyl group of the amide to an aromatic ring having a residual carboxylic acidic group thereon. The invention further provides compositions for millbases, dispersions, coatings and inks.

17 Claims, No Drawings

AROMATIC AMIDE DISPERSANT

This application claims priority from PCT Application Serial No. PCT/US2019/047448, filed on Aug. 21, 2019, which claims the benefit of U.S. Provisional Application No. 62/721,320, filed on Aug. 22, 2018.

FIELD OF INVENTION

The present invention relates to a polymeric aromatic amide dispersant, and a composition containing a particulate solid, an aqueous medium or polar organic medium, and a polymeric dispersant having an aromatic ring with acid functionality chemically linked via an amide linkage to a tertiary amide pendant group linked to at least one solubilizing chain. The invention further provides compositions for millbases, dispersions, coatings (including paints) and inks.

BACKGROUND OF THE INVENTION

Many formulations such as inks, paints and millbases require effective dispersants for uniformly distributing a particulate solid in an aqueous or polar organic medium. For inks, it is desirable for ink manufacturers to generate printed products of high resolution and quality. The adaptability of a printing process to cater for the ever widening range of base substrates, resins and pigments is a challenge. The pigment dispersion should be compatible with the different formulations used to ensure good adhesion and resistance of the final coating. Poor pigment dispersion or stabilization can result in agglomeration or settling within the polar organic liquid medium or an aqueous liquid medium.

PCT Patent Publication WO 2008/028954 discloses imide dispersant compounds containing terminal acidic groups in both a polar and a non-polar organic medium, where the dispersant compound is represented by the structure:

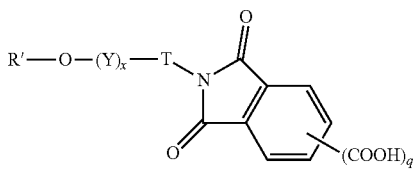

where T is —$(CH_2)_3$— or —$CH_2CH(CH_3)$—;
R' is H or $C_{1-50}$-optionally substituted hydrocarbyl group or $C_{1-50}$-optionally substituted hydrocarbonyl;
Y is $C_{2-4}$-alkyleneoxy;
x is 2 to 90; and
q is 1 or 2.

U.S. Pat. No. 5,688,312 discloses an ink composition comprised of a colorant and an imide or bisimide with a viscosity from about 1 centipoise to 10 centipoise at a temperature of about 125 to 180° C. The imide or bisimide may be prepared by reacting phthalic anhydride and a mono- or di-amine. The monoamine may be, for example, dodecylamine or stearylamine. The diamine may be 1,12-dodecanediamine.

PCT Patent Publication WO 2007/139980 discloses a reaction product of at least one di-anhydride with at least two reactants which are different from each other, each of which reactants contains a primary or secondary amino, hydroxyl or thiol functional group, and at least one of which reactants is polymeric. The reaction product is useful in compositions such as inks and coatings.

U.S. Pat. No. 6,440,207 discloses a process for preparing dispersible dry organic pigments for aqueous systems by (a) milling a mixture containing (1) one or more organic pigments, (2) at least about 1% by weight, relative to the organic pigment, of one or more aromatic polyalkylene oxide dispersants, (3) 0 to about 10 parts by weight, relative to the organic pigment, of a milling liquid in which the organic pigment is substantially insoluble, (4) 0 to about 50% by weight, relative to the organic pigment, of one or more milling additives other than dispersant (2), and (5) 0 to about 20% by weight, relative to the organic pigment, of one or more surface treatment additives; (b) optionally, adding to the milled pigment (6) one or more liquids in which the organic pigment is substantially insoluble in amounts such that the total solids content is not reduced below about 10%, and (7) one or more multivalent metal salts and/or one or more quaternary ammonium salt; and (c) isolating the milled organic pigment. The aromatic polyalkylene oxide dispersant may be prepared by reacting in an autoclave containing 250 g of deionized water 19.8 g (0.100 mol) of 1,8-naphthalic anhydride and 105 g (0.105 mol) of Jeffamine™ XTJ-506 (83 wt % ethylene oxide, 17 wt % propylene oxide). The autoclave was sealed, heated with stirring to 150° C., and maintained at 150° C. for five hours. After the reaction had cooled, the resultant brown liquid was discharged into a beaker to which was then added 15 g of decolorizing charcoal. After stirring overnight, the suspension was filtered, and the filter cake washed with water, yielding approximately 500 g of an amber-colored filtrate having 23.63% solids content. The dry pigment can be employed in water-based paint systems.

US Patent Publication 2008/0202382 describes the use of a Michael reaction of a poly ether methacrylate and a polyamine for the dispersion of ultrafine particles. The invention relates to amine dispersants for organic dispersions and coating compositions that contain such dispersants.

US Patent Publication 2015/112020 describes the use of a fused aromatic imide pendant group as an anchor for pigment dispersants represented by the structure:

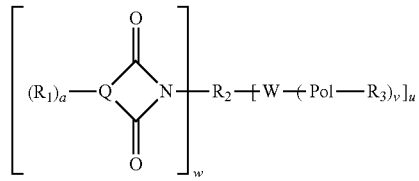

where $R_1$ is a substituent on Q ring in any available position for bonding to a substituent and independently represented by at least one electron withdrawing group, a is 1 or 2. W is oxygen, sulfur, NH or NG. $R_2$ is a $C_{1-20}$ hydrocarbylene group or a $C_{1-20}$ hydrocarbonylene group where $R_2$ contains more than 2 carbon atoms and can be linear or branched. $R_3$ is H or $C_{1-50}$ optionally substituted hydrocarbyl group bonding to a terminal oxygen atom of the polymer chain forming a terminal ether or ester. Pol is a homopolymer chain of ethylene oxide or a copolymer chain of ethylene oxide wherein the ethylene oxide constitutes 40 wt % to 99.99 wt % of the copolymer chain consisting of polyether or polyester.

SUMMARY OF THE INVENTION

One objective of the present invention is to provide a dispersant capable of giving low viscosity colloidally stable dispersions with carbon black and inorganic pigments. By providing more colloidal stability, one can improve color strength, other tinctorial properties, increasing a particulate solid load, forming improved dispersions, having improved brightness, producing a composition with reduced viscosity, maintain stable dispersion, reduced particle size and reduced particle size distribution, reduce haze, improve gloss, improve color strength and increase jetness (especially when the composition is black). The composition of the present invention may also be colloidally stable under ambient storage, and high temperature storage conditions.

We recently discovered that first reacting a primary amine terminated solubilizing chain, such as a polyether amine with an acrylate or epoxide as later described and then an anhydride of an aromatic is advantageous as only an amide (and not an imide) can be formed.

The resulting free carboxyl group on the aromatic ring significantly enhances dispersion performance on inorganic pigments in addition to organic and carbon black pigments.

Aromatic Amide Functional Dispersants

A dispersant or salt thereof comprising a dispersant polymer having the following structure:

Formula I

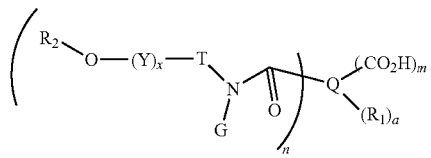

n is independently 1 or 2 in each dispersant polymer, so the dispersant could be a blend of dispersants where sometimes n is 1 and sometimes n is 2, and m is equal to n in said dispersant molecule, so if n is 1, m is 1 and if n is 2, m is 2;

$R_1$ is independently CN, $NO_2$, Cl, Br, $CH_3$, $NH_2$ or OH; wherein a may be 0 to 4; and is more preferably 0, 1, 2 or 4;

$R_2$ is H or $C_{1-50}$ optionally substituted hydrocarbyl or $C_{1-50}$ optionally substituted hydrocarbonyl group;

G is a $C_{1-50}$ hydrocarbyl group optionally substituted with heteroatoms such as O or N represented as ether, ester, aldehyde, ketone, amide, urethane, alcohol or carboxylic acid group, or the residue (expected reaction and/or polymerization product of a chemical reaction of the named reactive species) of an optionally substituted alkyl (meth)acrylate or (meth)acrylamide, or the ring opening product of an epoxide of the formula

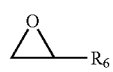

wherein $R_6$ can individually on each occurrence be H, $CH_3$, $C_2H_5$ or one of the following groups:

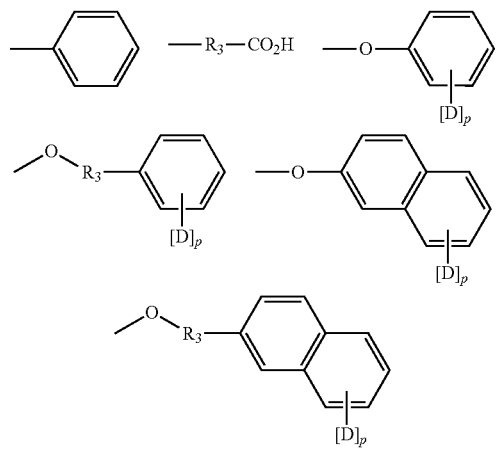

wherein D is $C_{1-5}$ alkyl group, CN, OH, $NO_2$, $NH_2$, halogen, $CO_2H$, $SO_3H$, $CH_3$ or $OCH_3$; and p is from 0 to 4;

$R_3$ is a linear or branched $C_{1-50}$ and preferably $C_{1-20}$ alkyl group;

wherein T is —C(O)—CH($R_4$)$CH_2$ or $C_{1-5}$ hydrocarbyl chain;

when G is $C_{1-50}$ hydrocarbyl, T is —C(O)—CH($R_4$)$CH_2$;

when G is residue (expected reaction and/or polymerization product of a chemical reaction of the named reactive species) of acrylate or epoxide, T is $C_{1-5}$ hydrocarbyl chain;

$R_4$ is H or Me, preferably H;

Y independently in each repeat unit is $C_{2-4}$ alkyleneoxy;

Q is a hydrocarbylene group comprising one or more aromatic ring, optionally substituted with $R_1$, (comprising up to three or four rings), optionally being fused if two aromatic rings are present, Q may be based on a phenyl, biphenyl or fused aromatic ring such as naphthalene. In one embodiment, Q may be based on a benzene ring attached to one amide linkage. In one preferred embodiment, Q is based on a naphthalene ring attached to one amide linkage. The carboxylic acid group attached to Q are attached to a carbon atom of the aromatic ring of Q; and x is 2 to 90.

DETAILED DESCRIPTION OF THE INVENTION

The present invention provides a dispersant and a composition comprising said dispersant, a particulate solid (such as a pigment or filler) and an aqueous or polar organic media and uses of said particulates, dispersants, and continuous media as mill bases, inks, coatings (paint), etc. If used as a coating, the composition can optionally include a binder.

The polymer chain represented by (Y)x may have number average molecular weight of 100 to 10,000, or 100 to 5,000, or 300 to 3,000, or 400 to 2,500.

The number average molecular weight may be determined for a pre-prepared polymer chain by GPC analysis. The number average molecular weight of a polymer that is prepared in-situ, i.e., the polymer chain is grown off the initiating species (initiator) group may be calculated by determining the degree of polymerization (DP) which is proportional to the ratio of monomer [M] and initiator [I](the initiator being the fused aromatic anhydride derived intermediate), and calculated by the formula DP=[M]/[I]. Analysis using nuclear magnetic resonance (NMR) can be used to determine the degree of polymerization and thus to calculate number average molecular weight of the polymeric group or polymer segment of the molecule.

Definition of hydrocarbylene group. As used herein, the term "hydrocarbylene" is used in the ordinary sense of the term and is intended to include any divalent radical formed by removing two hydrogen atoms from a hydrocarbon. The terms "hydrocarbyl" or "hydrocarbylene" denotes a group having a carbon atom directly attached to the remainder of the molecule and having a hydrocarbon or predominantly hydrocarbon character within the context of this invention. Such groups include the following: (1) Purely hydrocarbon groups, that is, aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic groups, and the like, as well as cyclic groups wherein the ring is completed through another portion of the molecule (that is, any two indicated substituents may together form an alicyclic group). Examples include methyl, ethyl, octyl, decyl, octadecyl, cyclohexyl, phenyl, etc. (2) Substituted hydrocarbon groups; that is, groups containing non-hydrocarbon substituents which do not alter the predominantly hydrocarbon character of the group. Those skilled in the art will be aware of suitable substituents. Examples include hydroxy, nitro, cyano, alkoxy, acyl, etc. (3) Hetero groups; that is, groups which, while predominantly hydrocarbon in character, contain atoms other than carbon and hydrogen in a chain or ring otherwise composed of carbon atoms. Suitable hetero atoms will be apparent to those skilled in the art and include, for example, nitrogen, oxygen and sulfur.

As used herein, the term "hydrocarbonylene" is intended to include any hydrocarbon group containing a carbonyl group (>C=O), e.g., a hydrocarbon group containing a ketone group or an aldehyde group. Typically, a hydrocarbonylene group may include —(CH$_2$)$_5$—C(O)—, —(CH$_2$)$_4$—C(O)—, —(CH$_2$)$_3$—C(O)— or —(CH$_2$)$_2$—C(O)—. As used herein, reference to hydrocarbylene or hydrocarbonylene groups may be linear or branched, and saturated or unsaturated.

A dispersant or salt thereof is disclosed comprising a dispersant polymer having the following structure:

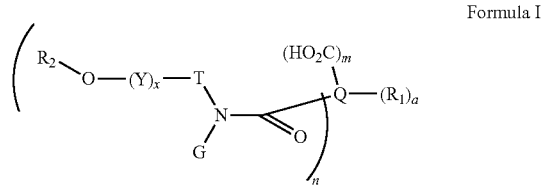

Formula I n is independently 1 or 2 in each dispersant polymer, so the dispersant could be a blend of dispersants where sometimes n is 1 and sometimes n is 2, and m is equal to n in said dispersant molecule, so if n is 1, m is 1 and if n is 2, m is 2;

$R_1$ is independently CN, NO$_2$, Cl, Br, CH$_3$, NH$_2$ or OH; wherein a may be 0 to 4; and is more preferably 0, 1, 2 or 4;

$R_2$ is H or C$_{1-50}$ optionally substituted hydrocarbyl or C$_{1-50}$ optionally substituted hydrocarbonyl group;

G is a C$_{1-50}$ hydrocarbyl group optionally substituted with heteroatoms such as O or N represented as ether, ester, aldehyde, ketone, amide, urethane, alcohol or carboxylic acid groups, or the residue (expected reaction and/or polymerization product of a chemical reaction of the named reactive species) of an optionally substituted alkyl (meth)acrylate or (meth)acrylamide, or the ring opening product of an epoxide of the formula

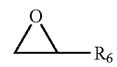

wherein $R_6$ can individually on each occurrence be H, CH$_3$, C$_2$H$_5$ or one of the following groups:

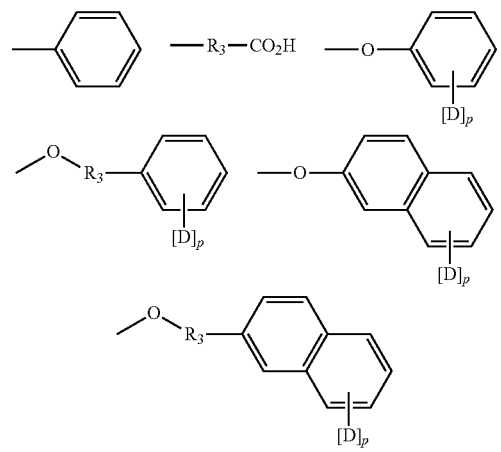

where D is C$_1$ to C$_5$ alkyl group, CN, OH, NO$_2$, NH$_2$, halogen, CO$_2$H, SO$_3$H, CH$_3$ or OCH$_3$; and p is from 0 to 4;

$R_3$ is a linear or branched C$_{1-50}$ and preferably C$_{1-20}$ alkyl group;

T is —C(O)—CH(R$_4$)CH$_2$ or C$_{1-5}$ hydrocarbyl chain;

when G is C$_{1-50}$ hydrocarbyl, T is —C(O)—CH(R$_4$)CH$_2$;

when G is residue (expected reaction and/or polymerization product of a chemical reaction of the named reactive species) of acrylate or epoxide, T is C$_{1-5}$ hydrocarbyl chain;

$R_4$ is H or Me, preferably H;

Y independently in each repeat unit is C$_{2-4}$ alkyleneoxy;

Q is a hydrocarbylene group comprising one or more aromatic ring, optionally substituted with $R_1$, (up to three or four rings), optionally being fused if two aromatic rings are present, Q may be based on a phenyl, biphenyl or fused aromatic ring such as naphthalene. In one embodiment, Q may be based on a benzene ring attached to one amide linkage. In one preferred embodiment, Q is based on a naphthalene ring attached to one amide linkage. The carboxylic acid group attached to Q are attached to a carbon atom of the aromatic ring of Q;

wherein the hydrogen of any acid in the formula can be replaced by a metal, amine, or ammonium cation to place the dispersant in the form of a salt; and x is 2 to 90. By metal, amine or ammonium, we mean alkali earth metals (e.g., K, Li, Na), alkaline earth metals (e.g., Mg and Ca), water soluble amines (meaning amines soluble in water at 5 wt % or higher concentrations at 25° C.), and ammonium hydroxide.

Embodiment 1a

The reaction between polyether amine and (meth)acrylate

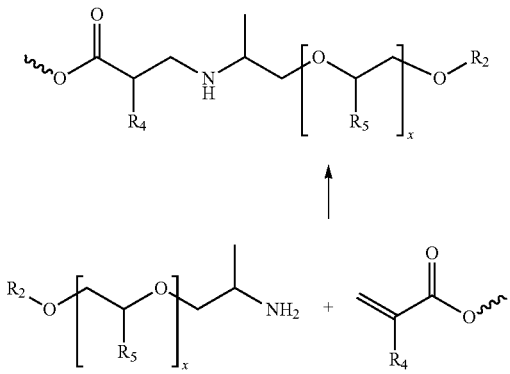

Embodiment 2a

The reaction between polyether amine and epoxide

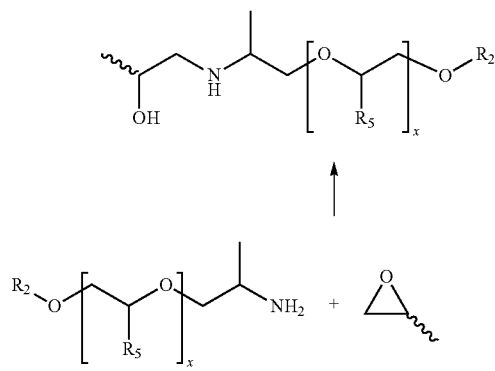

Embodiment 3a

The reaction between alkyl amine and polyether (meth)acrylate

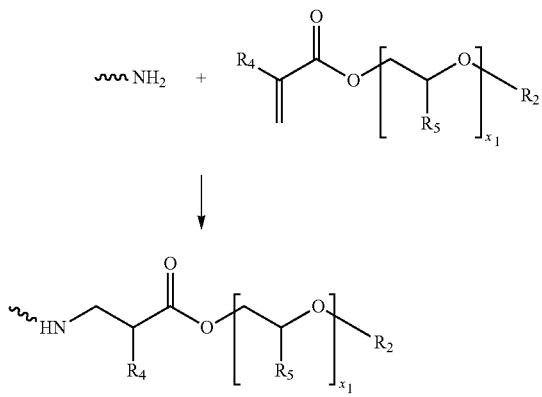

The following are structures for the units added to the nitrogen atom of the amide linkage before the nitrogen is reacted with a carboxylic group of the aromatic ring to form an amide linkage. The * represents the point of attachment of the shown structure to the nitrogen atom. These structures are derived from the unsaturated monomers shown farther down (such as the various acrylates).

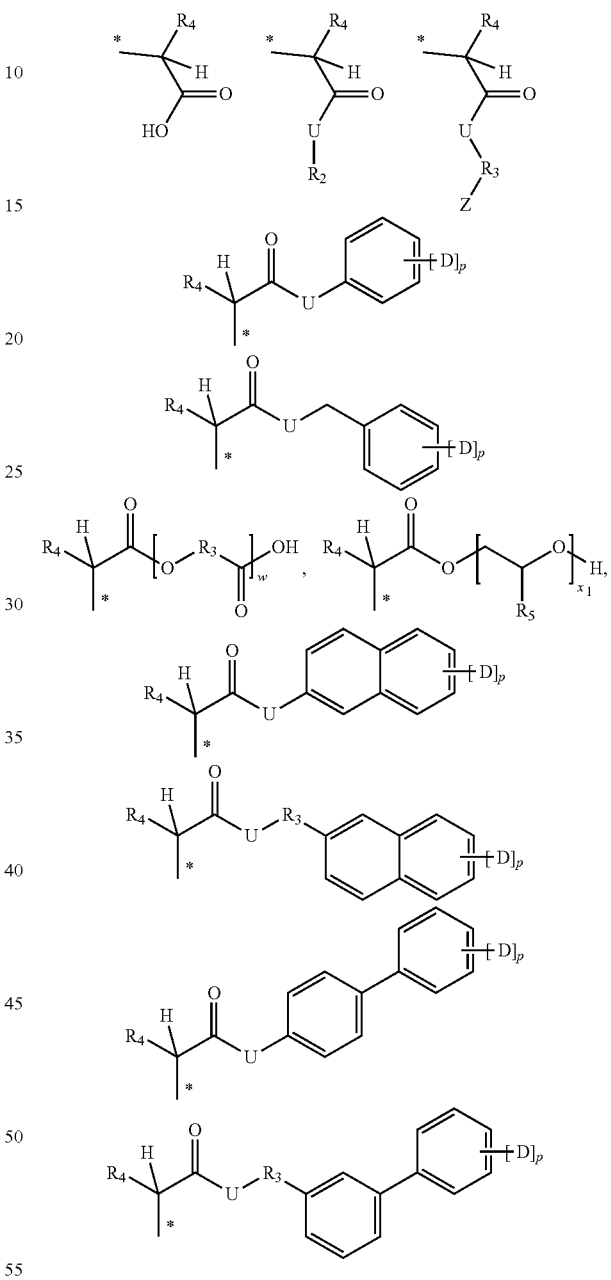

Z is —OH, —N($R_7$)$_2$ (where $R_7$ individually at each occurrence is a $C_{1-5}$ alkyl group), $C_{3-6}$ cycloalkyl group, a 5, 6 or 7 atom heterocycle of carbon and oxygen and/or nitrogen; or acid group such as $CO_2H$, $SO_3H$, $OPO_3H_2$, U is O or NH, w is 1 to 20, preferably 1 to 10 and most preferably 1-5. D and p are as previously defined and xi is an integer from 1 to 50 and more desirably from 1 to 20. The value of 1 to 20 is preferred for w when the media for dispersing particulate is or contains large amounts of polar organic solvent. The value of 1 to 5 for w is preferred when the media for dispersing particulate is water.

Examples of monomers that would form G are as follows, where U is O or NH, $R_2$ is a H or $C_{1-50}$ optionally substituted hydrocarbyl or $C_{1-50}$ optionally substituted hydrocarbonyl group, $R_3$ is a linear or branched $C_{1-50}$ and preferably $C_{1-20}$ alkyl group, $R_4$ is H or $CH_3$, $R_5$ is H or a methyl, ethyl, propyl, butyl or phenyl group and xi is 1 to 20. D is $C_{1-5}$ alkyl group, CN, OH, $NO_2$, $NH_2$, halogen, $CO_2H$, $SO_3H$, $CH_3$ and $OCH_3$ and p is from 0 to 4.

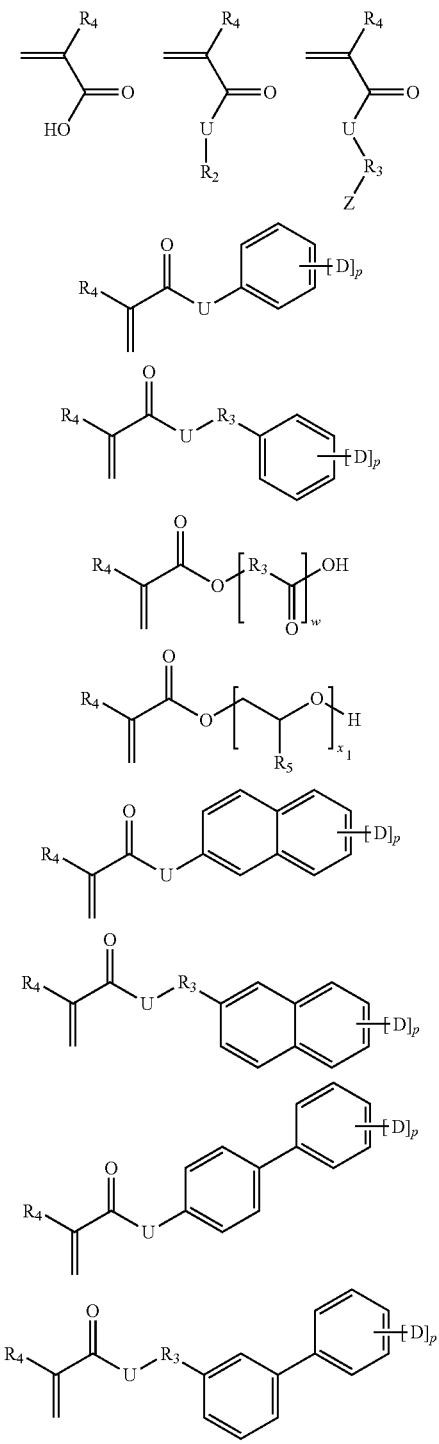

Example of an epoxide that would form G is as follows:

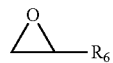

wherein $R_6$ can individually on each occurrence be H, $CH_3$, $C_2H_5$ or the following groups:

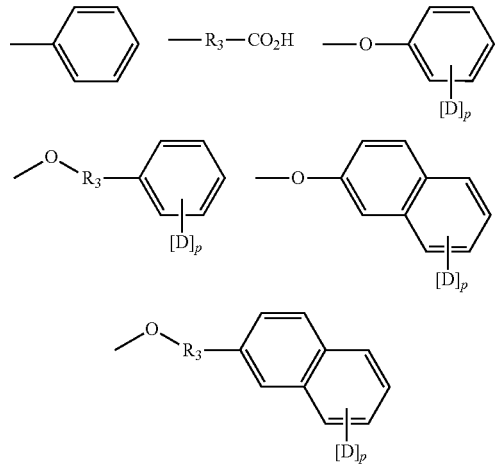

wherein D is $C_{1-5}$ alkyl group, CN, OH, $NO_2$, $NH_2$, halogen, $CO_2H$, $SO_3H$, $CH_3$ or $OCH_3$ and p is from 0 to 4. Examples of these epoxides are shown below.

The dispersant can have the following structures:

Formula IIa

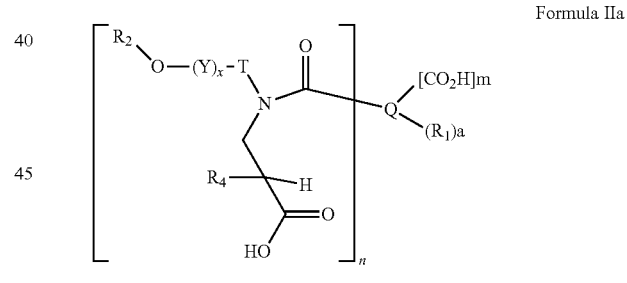

Formula IIb

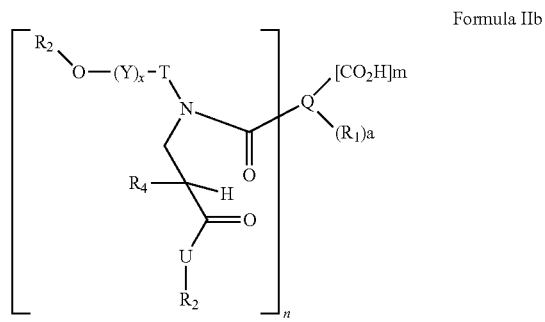

Formula IIc

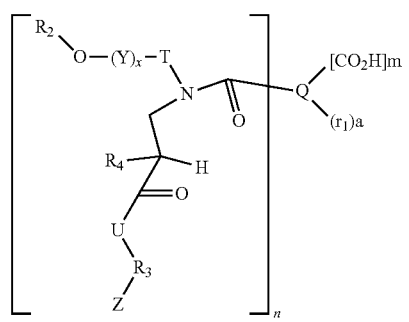

Formula IIIa

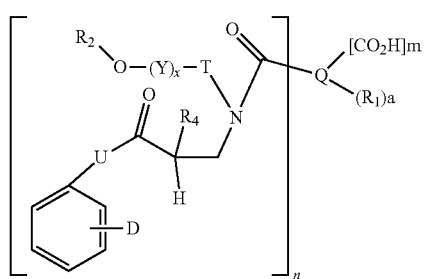

Formula IIIb

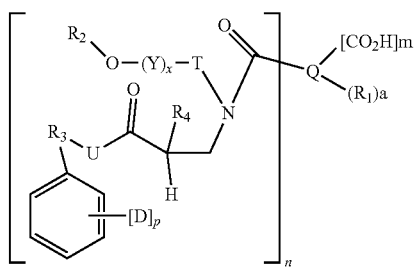

Formula IVa

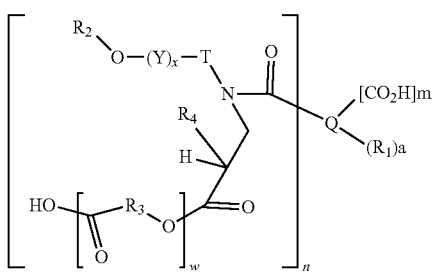

Formula IVb

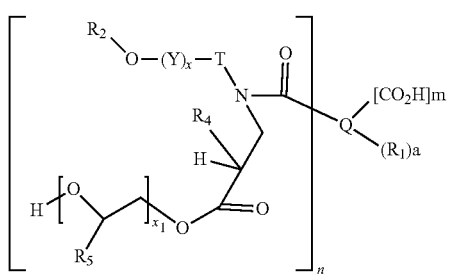

Formula V

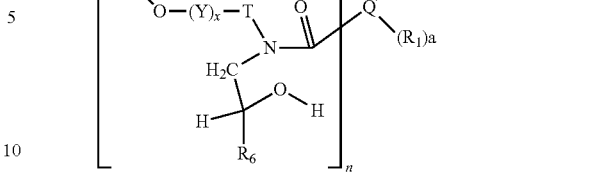

Where $R_6$ can be $R_2$, an optionally substituted benzene ring, a $R_3$—$CO_2H$ group, an ether linkage to an optionally substituted benzene ring, or an ether linkage to an optionally substituted naphthalene fused aromatic ring structure.

Q is an organic structure comprising at least one and up to 3 or 4 aromatic rings (which may optionally be fused together) and may be based on a phenyl, biphenyl or fused aromatic ring such as naphthalene. In one embodiment, Q may be a single benzene ring derived from phthalic anhydride. A starting material for the dispersant can be tetrachlorophthalic anhydride or tetrabromophthalic anhydride.

Q may be based on a naphthalene, an anthracene, a phenanthrene, or mixtures thereof. In one embodiment, Q may be based on a naphthalene. Typically, Q-$(R_1)_a$ is based on nitro-naphthalene and is derived from nitro-naphthalic anhydride. When Q is based on naphthalene, the polymer chain of Formula I may have a naphthalene amide group such as a 1,2-naphthalene acid amide, 1,2-naphthalene amide acid, 2,3-naphthalene amide acid, a 1,8-naphthalene amide acid group, or mixtures thereof.

Examples anhydrides that would form Q are as follows where $R_1$ is CN, $NO_2$, Cl, Br, $CH_3$, $NH_2$ and OH. Note $R_1$ may be present on any of the aromatic rings

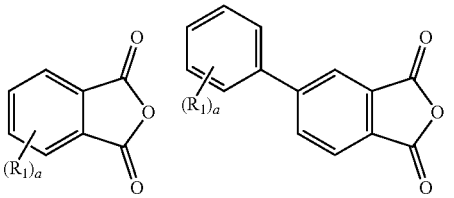

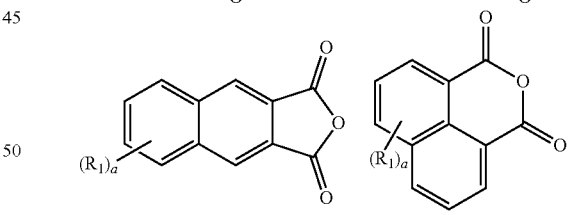

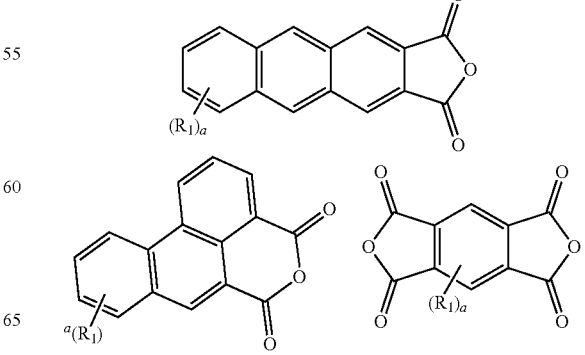

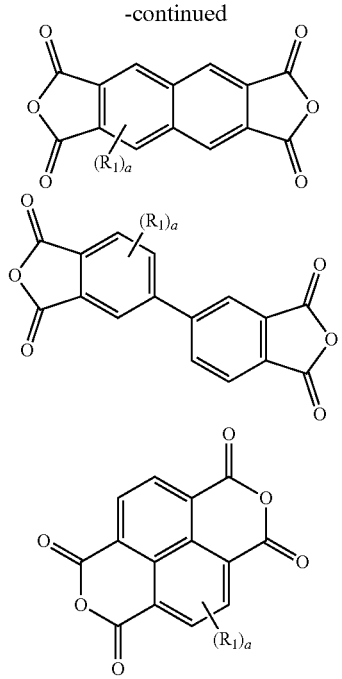

When Q is based on anthracene, the polymer chain of Formula I may have a 1,2-anthracene acid amide, 1,2-anthracene amide acid, 2,3-anthracene acid amide, 1,9-anthracene acid amide or a 1,9-anthracene amide acid group, or mixtures thereof. When Q is based on phenanthrene, the polymer chain of Formula I may have a 2,3-phenanthrene acid amide, 2,3-phenanthrene amide acid, 1,2-phenanthrene acid amide, 1,2-phenanthrene amide acid, 3,4-phenanthrene amide acid, 3,4-phenanthrene acid amide, 1,10-phenanthrene acid amide or a 1,10-phenanthrene amide acid group, or mixtures thereof.

In one embodiment typically, Q is based on 1,8-naphthalene anhydride, or 2,3-naphthalene anhydride, or mixtures thereof. The dispersant may be derived from a naphthalene anhydride such as 4-nitro-1,8-naphthalic amide or 3-nitro-1,8-naphthalic amide (when one $R_1$=$NO_2$) or 4-chloro-1,8-naphthalic amide (when one $R_1$=Cl) group.

$R_1$ may be electron-withdrawing or donating (such as —$NO_2$ group, or a halo group, typically —Cl), or mixtures thereof. When $R_1$ is electron-withdrawing, the $R_1$ may be either meta-substituted or para-substituted relative to the amide group or mixtures thereof. In one embodiment, the $R_1$ may be meta-substituted relative to the amide group. During the preparation of the polymer chain of the invention, the fused aromatic amide may have substitution at position 3- and/or 4- on Q.

Structure may be prepared by a process that comprises reacting a Michael acceptor, such as an acrylate or functionally substituted acrylate, with a nucleophilic polymeric chain, such as a polyether amine, forming a secondary amine and then reacting the secondary amine with an aromatic di-acid or anhydride, such as 2,3-naphthalic anhydride, to form the tertiary amide and structure invention presented. The first step, the Michael reaction, may be carried out at a sufficiently high temperature for activation, e.g., 0° C. to 150° C. or 50° C. to 200° C. The second step of the reaction to form the tertiary amide is carried out at a sufficiently high temperature for amidation, e.g., at least 50° C. or 500 to 120° C.

Structure may be prepared by a process that comprises reacting a polymeric acrylate, such as MPEG acrylate, then reacting with a nucleophilic aliphatic amine forming a secondary amine and reacting the secondary amine with an aromatic di-acid or anhydride, such as 2,3-naphthalic anhydride, to form the tertiary amide and structure of the invention presented. The first step, the Michael reaction, may be carried out at a sufficiently high temperature for activation, e.g., 0° C. to 150° C. or 50° C. to 200° C. The second step of the reaction to form the tertiary amide is carried out at a sufficiently high temperature for amidation, e.g., at least 50° C. or 50° C. to 120° C.

Structure may be prepared by a process that comprises reacting a hydroxyl acrylate, such as hydroxyethyl acrylate, then reacting with a nucleophilic aliphatic amine forming a secondary amine and reacting the secondary amine with an aromatic di-acid or anhydride forming the tertiary amide. The product is then reacted with a cyclic ester, such as caprolactone, and polymerised to form the polymeric chain. The first step, the Michael reaction, may be carried out at a sufficiently high temperature for activation, e.g., 0° C. to 150° C. or 50° C. to 200° C. The second step of the reaction to form the tertiary amide is carried out at a sufficiently high temperature for amidation, e.g., at least 50° C. or 50° C. to 120° C. The polymerisation may be carried out at a sufficiently high temperature for polymerisation, e.g., at least 100° C. to 200° C.

Embodiment 1—Aromatic Amide Functional Dispersant with Polyether Chains

In embodiment 1, a polyether amine is reacted with a (meth)acrylate (optionally substituted) via a Michael reaction to create a secondary amine and then the secondary amine is reacted with an aromatic anhydride. This is covered by Formulas IIa, IIb, IIc, IIIa, IIIb, IVa, and IVb.

$R_3$ is $C_{1-50}$ (or $C_{1-20}$)-optionally substituted hydrocarbyl group that bonds to a terminal oxygen atom of the polymer chain forming a terminal ether or $C_{1-50}$ (or $C_{1-20}$)-hydrocarbonyl group (i.e., a hydrocarbyl group containing a carbonyl group) that bonds to the oxygen atom of the polymer chain forming a terminal ester group or terminal urethane group, and the substituent may be halo, ether, ester, or mixtures thereof;

$R_5$ may be H or a mixture of H (in an amount sufficient to provide ethylene oxide groups at 40 wt % to 99.99 wt %) and at least one of methyl, ethyl and phenyl. The optionally substituted (meth)acrylates could be any of those shown below where the variables are as previously defined.

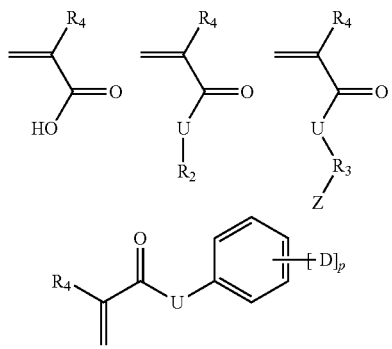

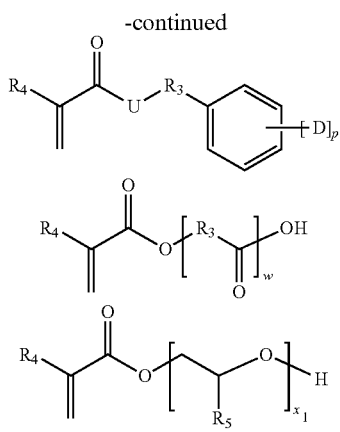

A reaction of a polyetheramine with (meth)acrylic acid then an aromatic anhydride, for example the reaction of Surfonamine® L207 with acrylic acid then 2,3-naphthalic anhydride. A reaction of a polyetheramine with a tertiary amino alkyl (meth)acrylate then an aromatic anhydride, for example the reaction of Surfonamine® L200 with dimethylaminoethyl acrylate then 1,2-naphthalic anhydride.

A reaction of a polyetheramine with an alkyl (meth) acrylate then an aromatic anhydride, for example the reaction of Surfonamine® L200 with butyl acrylate then 1,2-naphthalic anhydride.

The polyether may have number average molecular weight of 100 to 10,000, 100 to 5,000, or 300 to 3,000, or 400 to 2,500. The polyetheramine may be prepared by reacting a mono-alcohol initiator with ethylene oxide only or with a mixture of ethylene oxide and propylene oxide to form an alcohol-ended polymer chain, followed by conversion of the alcohol-ended polymer chain to an amine. The polyetheramine may be obtained by alkoxylation of aminoalcohols as is described in U.S. Pat. No. 5,879,445 (in particular the disclosure in column 2, line 50 to column 7, line 50).

For aqueous dispersions (50-100% water) the polyether may, for example, be a copolymer of ethylene oxide and propylene oxide. The polyether may be derived from:
    0 to 60 wt % propylene oxide, and 40 to 100 wt % ethylene oxide, or
    0 to 50 wt % propylene oxide, and 50 to 100 wt % ethylene oxide, or
    0 to 30 wt % propylene oxide, and 70 to 100 wt % ethylene oxide, or
    0 to 20 wt % propylene oxide, and 80 to 100 wt % ethylene oxide, or
    0 to 15 wt % propylene oxide, and 85 to 100 wt % ethylene oxide.

The polyether amine may be commercially available as the Surfonamine® amines from Huntsman Corporation. Specific examples of Surfonamine® amines are L-100 (propylene oxide to ethylene oxide mix ratio of 3/19), and L-207 (propylene oxide to ethylene oxide mix ratio of 10/33), L-200 (propylene oxide to ethylene oxide mix ratio of (4/41), and L-300 (propylene oxide to ethylene oxide mix ratio of 8/58). The figures in parentheses are approximate repeat units of propylene oxide, and ethylene oxide respectively.

For polar organic media-based dispersions the polyether may be derived from:
    0 to 60 wt % ethylene oxide, and 40 to 100 wt % propylene oxide, or
    0 to 50 wt % ethylene oxide, and 50 to 100 wt % propylene oxide, or
    0 to 30 wt % ethylene oxide, and 70 to 100 wt % propylene oxide, or
    0 to 20 wt % ethylene oxide, and 80 to 100 wt % propylene oxide, or
    0 to 15 wt % ethylene oxide, and 85 to 100 wt % propylene oxide.

Embodiment 2—Aromatic Amide Functional Dispersant with Polyether Chain

In embodiment 2, a polyalkylene glycol (meth)acrylate is reacted with a primary amine then reacted with an aromatic anhydride. The primary amine reactant can be a polyether amine having a number-average molecular weight of 100 to 10,000, more desirable 400 to 2,500 containing alkylene oxide units such as ethylene oxide, propylene oxide, butylene oxide and styrene oxide; alternatively, the primary amine can be a lower molecular weight non-polymeric amine such as linear, branched, cyclic, and even aromatic containing hydrocarbyl or hydrocarbonyl group having 1 to 50, more desirable 1 to 20 carbon atoms and containing one or two (more desirably just one) primary amine and up to one or two secondary amines or other nitrogen containing groups such as amide linkages. Desirably the primary amine reactant can contain other heteroatoms such as oxygen and nitrogen (and optionally sulfur) in an amount of up to 4 heteroatoms each of oxygen, nitrogen and optionally sulfur per primary amine molecule. In one preferred embodiment, the primary amine is polyether amine such as the previously discuss Surfonamine® polyether amines. In another preferred embodiment, the primary amine is an alkyl amine without heteroatoms other than the nitrogen of the primary amine. In another preferred embodiment, the primary amine is an amino carboxylic acid containing $C_{1-20}$ and may contain other heteroatoms such as oxygen and nitrogen (and optionally sulfur). In another preferred embodiment, the primary amine is an amino alcohol containing $C_{1-20}$ and may contain other heteroatoms such as oxygen and nitrogen (and optionally sulfur). In another preferred embodiment, the primary amine is an aromatic amine containing $C_{1-20}$ and may contain other heteroatoms such as oxygen and nitrogen (and optionally sulfur).

An example is the reaction of butyl amine with a poly (ethylene glycol) (meth)acrylate Mn 1000 followed by reaction with an aromatic anhydride.

Embodiment 3 Aromatic Amide Functional Dispersant with Polyether Chains

In Embodiment 3, a polyalkyleneglycol(meth)acrylate is reacted with a polyether amine then reacted with an aromatic anhydride.

An example would be the reaction of Surfonamine® L100 with poly(ethylene glycol) acrylate Mn 350 then reaction with 3-nitro-1,8-naphthalic anhydride Embodiment 4 Aromatic Amide Functional Dispersant with Polyester Chain In Embodiment 4, a polyether amine is reacted with an epoxide (as previously defined) to create a secondary amine which is then reacted with an aromatic anhydride. An example would be the reaction of Surfonamine® L207 with 1,2-epoxy-3-phenoxypropane then reaction with 1,8-naphthalic anhydride.

In one embodiment, the invention provides a polymer comprising a polymer chain having at least one aromatic tertiary amide linking group attached to an aromatic group with a pendant acid functionality and a polyether group and a G group, wherein the polymer is represented by Formula I.

In one embodiment, the invention provides a polymer comprising a polymer chain having at least one aromatic tertiary amide linking group attached to an aromatic group with a pendant carboxylic acid functionality and a both a polyether group and a polyester group, wherein the polymer is represented by Formula I.

Examples of a lactones useful to polymerize the above polyester group include β-propiolactone, γ-butyrolactone, optional alkyl substituted ε-caprolactone and optionally alkyl substituted δ-valerolactone. The alkyl substituent in ε-caprolactone and δ-valerolactone may be $C_{1-6}$-alkyl, or $C_{1-4}$-alkyl, and may be linear or branched. Examples of suitable lactones are ε-caprolactone and the 7-methyl-, 2-methyl-, 3-methyl-, 5-methyl-, 6-methyl-, 4-methyl-, 5-tertbutyl-, 4,4,6-trimethyl- and 4,6,6-trimethyl-analogues of caprolactone or valerolactone.

The esterification catalyst may be any previously known to the art and include tin(II) octanoate, tetra-alkyl titanate, for example, tetrabutyltitanate, zinc salt of an organic acid, for example, zinc acetate, zirconium salt of an aliphatic alcohol, for example, zirconium isopropoxide, toluene sulphonic acid or a strong organic acid such as trifluoroacetic acid, or phosphoric acid.

The process may be carried out in an inert atmosphere provided by any inert gas of the Periodic Table but typically nitrogen. The process may be carried out in a melt, or in the presence or absence of solvent. The solvent may be a non-polar solvent (such as an aromatic or aliphatic compound), a polar organic solvent or water. The solvents are well known in the art.

In one embodiment, the polymer of the present invention (typically represented by Formula I) may be obtained/obtainable by a process comprising Step (1): reacting a Michael acceptor, such as an acrylate, with a nitrogen atom of a nucleophilic polymeric chain, such as a polyether amine, forming a polyether secondary amine; Step (2): reacting said polyether secondary amine with an aromatic di-acid or anhydride, such as 2,3-naphthalic anhydride, to form the tertiary amide connecting group between said aromatic acid and said polyether.

In the above embodiment, said first step can be conducted at a temperature from about 0° C. to 150° C., more desirably from about 30° C. to 80° C. and the second step of the reaction to form the tertiary amide can be carried out at a temperature from about 0° C. to 120° C., and more preferentially from about 30° C. to 80° C.

In one embodiment, the polymer of the present invention (typically represented by Formula I) may be obtained/obtainable by a process comprising: Step (1): reacting a polymeric acrylate macromonomer having an unsaturated acrylate functionality, such as MPEG acrylate with a nucleophilic aliphatic amine forming a MPEG functionalized secondary amine; and Step (2): reacting said MPEG functionalized secondary amine from Step (1) with an aromatic di-acid or anhydride, such as 2,3-naphthalic anhydride, to form the tertiary amide linkage from one of the acid groups of said di-acid or anhydride, connecting said MPEG to said aromatic di-acid now an acid/amide, wherein said first step, the Michael reaction, may be carried out at a temperature from about 0° C. to 150° C., more desirably from about 30° C. to 80° C.; said second step of the reaction to form the tertiary amide is carried out at a temperature, for amidation, from about 0° C. to 120° C., and more desirably from about 30° C. to 80° C.

In one embodiment, the invention provides a composition comprising a particulate solid, an aqueous medium or polar organic medium, and a dispersant of Formula I having at least one tertiary amide pendant group, wherein the dispersant is represented by Formula I defined above. The composition may be a millbase, coating (paint), or ink.

In one embodiment, the invention provides a composition comprising a particulate solid, an aqueous medium or a polar organic medium, a dispersant according to Formula I, and a binder. In one embodiment, the binder may be polyepoxide, polyurethane, polyamide, poly(meth)acrylate, polyester, cellulose or alkyd.

In one embodiment, the invention provides a composition comprising a particulate solid, an aqueous medium or polar organic medium, and a dispersant having at least one tertiary amide linking group, wherein the dispersant is represented by Formula I above further comprises a binder. In one embodiment, the binder may be cellulose (such as nitrocellulose), polyurethane, poly(meth)acrylate, polyester, or polyamide.

The particulate solid disclosed herein in a composition of the present invention may be a pigment or a filler. The pigment may, in one embodiment, be an organic pigment, in one embodiment the pigment can be an inorganic pigment, and in one embodiment the pigment can be carbon black. In this disclosure, particulates of the inorganic type or carbon black are preferred.

In one embodiment, the invention provides a coating (paint) or ink comprising a particulate solid, an aqueous medium or a polar organic medium, a film-forming resin and a dispersant of the invention disclosed herein.

In one embodiment, the invention provides a coating (paint) or ink comprising a particulate solid, a polar organic medium, a film-forming resin and a dispersant of the invention disclosed herein.

When the composition is an ink, the ink may be an ink-jet ink, a flexo ink, offset ink or a gravure ink. The ink may be a radiation curable ink.

In one embodiment, the invention provides for a composition comprising a dispersant represented by Formula I defined above, an inorganic pigment (and/or carbon black) and a binder. The binder may be selected from the group consisting of cellulose, polyacrylic, polyester, polyether, polyurethane, alkyds and polyamide. The composition may be used in an ink for a printing process, such as a flexographic printing process or ink jet inks such as radiation curable, non-impact and drop on demand.

The dispersant of the present invention may be present in a composition disclosed herein in an amount ranging from 0.1 wt % to 79.6 wt %, or 0.5 wt % to 30 wt %, or 1 wt % to 25 wt % of the total weight of the composition.

In one embodiment, the invention provides for the use of the dispersant polymer, wherein the dispersant polymer is represented by Formula I defined above as a dispersant in a composition disclosed herein.

In one embodiment, the invention provides for the use of a dispersant represented by Formula I defined above as a dispersant in an ink composition using at least one of carbon black and inorganic pigment. The ink composition may have at least one of reduced particle size and reduced particle size distribution (typically reduced to an average of 150 nm or less), reduced haze, improved gloss, increased jetness (especially when the composition is black) and be stable under ambient storage, and high temperature storage conditions.

Without being bound by theory, it is believed that the aromatic amide as pendant group may act as an anchor group between the dispersant of invention and a particulate solid such as a pigment selected from inorganic pigment and/or carbon black.

The aminocarboxylic acid (or amino-acid) may be an amino-$C_{2-20}$-alk(en)ylene carboxylic acid and may or may not contain more than one carboxylic acid group and may or may not contain more than one amino group. The aminocarboxylic acid may or may not contain other groups containing heteroatoms such as hydroxyl or thiol groups. The alk(en)ylene group may be linear or branched. The alk(en)ylene group of the amino carboxylic acid contains not greater than 12 carbon atoms. Specific examples include 11-amino undecanoic acid, 12-amino dodecanoic acid, 6-amino caproic acid, 4-aminobutyric acid, aspartic acid, glutamic acid, lysine, asparagine, glutamine, threonine, serine, cysteine, β-alanine, glycine, and sarcosine. Mixtures of amino carboxylic acids may be used.

The technical feature defined within Q of 4n+2 π-electrons is well known to a skilled person as Hückel's rule. Typically, n may be equal to 2 (i.e., the number of 7-electrons is 10), or 3 (i.e., the number of 7-electrons is 14). In one embodiment, n may be equal to 2.

Typically, Q comprises one or more aromatic rings (optionally fused) derived from aromatic di or tetracarboxylic acid or their anhydrides, or mixtures thereof. $R_1$ is independently CN, $NO_2$, Cl, Br, $CH_3$, $NH_2$ or OH where a may be 0 to 4.

$R_2$ may be an alkyl or optionally-substituted alkyl having an alkyl group that is linear or branched.

The alkyl groups defined by $R_2$ include methyl, ethyl, propyl, butyl, pentyl, hexyl, heptyl, 2-ethylhexyl, nonyl, decyl, undecyl, dodecyl, tridecyl, tetradecyl, pentadecyl, hexadecyl, heptadecyl, octadecyl, nonadecyl, eicosyl, or mixtures thereof. In one embodiment, $R_2$ may be derived from an alkanol.

$R_3$ may independently be a $C_{1-50}$, more desirably $C_{1-20}$ optionally substituted hydrocarbyl group such as an alkyl group.

The polyether amine may be commercially available as the Surfonamine® amines from Huntsman Corporation. Specific examples of Surfonamine® amines are L-100 (propylene oxide to ethylene oxide mix ratio of 3/19), and L-207 (propylene oxide to ethylene oxide mix ratio of 10/32), L-200 (propylene oxide to ethylene oxide mix ratio of 3/41), and L-300 (propylene oxide to ethylene oxide mix ratio of 8/58). The figures in parentheses are approximate repeat units of propylene oxide, and ethylene oxide respectively.

In Formula I, the integer y is such that the $R_2$—O—(Y)$_x$-T-N chain may have number average molecular weight of 100 to 10,000, or 100 to 5,000, or 300 to 3,000, or 400 to 2,500.

The reaction of the above is how to make the pendant polyether chain, with the oxirane in the processes described above may be carried out at a temperature of 100° C. to 200° C. in the presence of a base such as potassium hydroxide or sodium hydroxide.

In Formulas I and II, III, IV and IV and subsets thereof, a dispersant may be formed for a water rich organic medium wherein the polyether contains at least 60 wt % to 100 wt % ethylene oxide, alternatively an embodiment wherein the dispersant is formed for a polar organic medium wherein the polyether contains at least 40 wt % to 60 wt % ethylene oxide.

Typically, for an aqueous medium dispersant the (Y)x of Formula I contains 60 wt % to 100 wt %, 70 wt % to 100 wt %, or 80 wt % to 100 wt %, or 100 wt % ethylene oxide; and 0 wt % to 40 wt %, or 0 wt % to 30 wt %, or 0 wt % to 20 wt %, or 0 wt % propylene oxide based on the weight of $(Y)_x$.

The polymer of the invention may have multiple polymer chain types attached to represented by Formula IVa, IVb.

The polymer chain of Formula I or any sub-formulas thereof may have a number average molecular weight of 200 to 10,000, or 300 to 5,000, or 500 to 3,000, or 600 to 2,500. Typically, the polymer chain of Formula I or any sub-formulas thereof may have number average molecular weight of 1,000 to 2,500.

INDUSTRIAL APPLICATION

The particulate solid present in the composition may be any inorganic or organic solid material which is substantially insoluble in the organic medium and/or insoluble in water at the temperature concerned and which it is desired to stabilize in a finely divided form therein. The particulate solids may be in the form of a granular material, a fiber, a platelet or in the form of a powder, often a blown powder. In one embodiment, the particulate solid is a pigment.

The particulate solid (typically a pigment or filler) may have an average particle size measured by light scattering measurements of from 10 nanometers to 10 microns, or 10 nanometers to 1, 2, 3 or 5 microns, or 20 nanometers to 1, 2, 3 or 5 microns in diameter.

Examples of suitable solids are pigments, extenders, fillers, blowing agents and flame retardants for paints and plastic materials; dyes, especially disperse dyes; optical brightening agents and textile auxiliaries; pigments for inks, toners; solids for oil-based and inverse-emulsion drilling muds; dirt and solid particles in dry cleaning fluids; metals; particulate ceramic materials and magnetic materials for ceramics, piezoceramic printing, refractories, abrasives, foundry, capacitors, fuel cells, ferrofluids, conductive inks, magnetic recording media, water treatment and hydrocarbon soil remediation; organic and inorganic nanodisperse solids; metal, metal oxides and carbon for electrodes in batteries, fibers such as wood, paper, glass, steel, carbon and boron for composite materials; and biocides, agrochemicals and pharmaceuticals which are applied as dispersions in organic media.

In one embodiment, the solid is an organic pigment from any of the recognized classes of pigments described, for example, in the Third Edition of the Color Index (1971) and subsequent revisions of, and supplements thereto, under the chapter headed "Pigments." Examples of organic pigments are those from the azo, disazo, trisazo, condensed azo, azo lakes, naphthol pigments, anthanthrone, anthrapyrimidine, anthraquinone, benzimidazolone, carbazole, diketopyrrolopyrrole, flavanthrone, indigoid pigments, indanthrone, isodibenzanthrone, isoindanthrone, isoindolinone, isoindoline, isoviolanthrone, metal complex pigments, oxazine, perylene, perinone, pyranthrone, pyrazoloquinazolone, quinacridone, quinophthalone, thioindigo, triarylcarbonium pigments, triphendioxazine, xanthene and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. In one embodiment, the organic pigments are phthalocyanines, especially copper phthalocyanines, monoazos, disazos, indanthrones, anthranthrones, quinacridones, diketopyrrolopyrroles, perylenes and carbon blacks.

Examples of inorganic pigments include metallic oxides such as titanium dioxide, rutile titanium dioxide and surface coated titanium dioxide, titanium oxides of different colors such as yellow and black, iron oxides of different colors such as yellow, red, brown and black, zinc oxide, zirconium oxides, aluminium oxide, oxymetallic compounds such as bismuth vanadate, cobalt aluminate, cobalt stannate, cobalt zincate, zinc chromate and mixed metal oxides of two or more of manganese, nickel, titanium, chromium, antimony, magnesium, cobalt, iron or aluminium, Prussian blue, vermillion, ultramarine, zinc phosphate, zinc sulphide, molybdates and chromates of calcium and zinc, metal effect pigments such as aluminium flake, copper, and copper/zinc alloy, pearlescent flake such as lead carbonate and bismuth oxychloride.

Inorganic solids include extenders and fillers such as ground and precipitated calcium carbonate, calcium sulphate, calcium oxide, calcium oxalate, calcium phosphate, calcium phosphonate, barium sulphate, barium carbonate, magnesium oxide, magnesium hydroxide, natural magnesium hydroxide or brucite, precipitated magnesium hydroxide, magnesium carbonate, dolomite, aluminium trihydroxide, aluminium hydroperoxide or boehmite, calcium and magnesium silicates, aluminosilicates including nanoclays, kaolin, montmorillonites including bentonites, hectorites and saponites, ball clays including natural, synthetic and expandable, mica, talc including muscovites, phlogopites, lepidolites and chlorites, chalk, synthetic and precipitated silica, fumed silica, metal fibers and powders, zinc, aluminium, glass fibers, refractory fibers, carbon black including single- and multi-walled carbon nanotubes, reinforcing and non-reinforcing carbon black, graphite, Buckminsterfullerenes, asphaltene, graphene, diamond, alumina, quartz, perlite, pegmatite, silica gel, wood flour, wood flake including soft and hard woods, saw dust, powdered paper/fibre, cellulosic fibers such as kenaf, hemp, sisal, flax, cotton, cotton linters, jute, ramie, rice husk or hulls, raffia, typha reed, coconut fibre, coir, oil palm fibre, kapok, banana leaf, caro, curaua, henequen leaf, harakeke leaf, abaca, sugar cane bagasse, straw, bamboo strips, wheat flour, MDF and the like, vermiculite, zeolites, hydrotalcites, fly ash from power plants, incinerated sewage sludge ash, pozzolans, blast furnace slag, asbestos, chrysotile, anthophyllite, crocidolite, wollastonite, attapulgite and the like, particulate ceramic materials such as alumina, zirconia, titania, ceria, silicon nitride, aluminium nitride, boron nitride, silicon carbide, boron carbide, mixed silicon-aluminium nitrides and metal titanates; particulate magnetic materials such as the magnetic oxides of transition metals, often iron and chromium, e.g., gamma-$Fe_2O_3$, $Fe_3O_4$, and cobalt-doped iron oxides, ferrites, e.g., barium ferrites; and metal particles, for instance metallic aluminium, iron, nickel, cobalt, copper, silver, gold, palladium, and platinum and alloys thereof.

Other useful solid materials include flame retardants such as pentabromodiphenyl ether, octabromodiphenyl ether, decabromodiphenyl ether, hexabromocyclododecane, ammonium polyphosphate, melamine, melamine cyanurate, antimony oxide and borates; biocides or industrial microbial agents such as those mentioned in tables 2, 3, 4, 5, 6, 7, 8 and 9 of the chapter entitled "Industrial Microbial Agents" in Kirk-Othmer's Encyclopedia of Chemical Technology, Volume 13, 1981, $3^{rd}$ Edition, and agrochemicals such as the fungicides flutriafen, carbendazim, chlorothalonil and mancozeb.

In one embodiment, the polar liquid medium is water but may contain up to 50% by weight (based on the combined weight of the water and polar solvent) of a water-soluble polar co-solvent. Examples of such co-solvents that may qualify as polar solvents are alcohols such as ethyl alcohol, isopropyl alcohol, n-propyl alcohol or n-butanol; or water-miscible organic solvents such as mono or dialkyl ethers of ethylene glycol or diethylene glycol; or polar solvents such as diethylene glycol, glycerol, 2-pyrrolidone, N-methyl pyrrolidone, cyclohexanol, caprolactone, caprolactam, pentane-1,5-diol, 2-(butoxyethoxy) ethanol and thiodiglycol, and ethylene glycol; including mixtures of any of the prior named alcohols or solvents. By the term "polar," in relation to the organic liquid, it is meant that an organic liquid is capable of forming moderate to strong bonds as described in the article entitled "A Three Dimensional Approach to Solubility" by Crowley et al. in Journal of Paint Technology, Vol. 38, 1966, at page 269. Polar organic liquids generally have a dielectric constant of 5 or more as defined in the abovementioned article. Non-polar liquids typically have a dielectric constant of less than 5.

A millbase or dispersion is useful for the preparation of water-borne paints (coatings) and inks by admixture with further amounts of water-compatible resin(s) and/or water and other ingredients which are conventionally incorporated into water-borne paints and inks, such as preservatives, stabilizers, antifoaming agents, water miscible co-solvents and coalescing agents.

The water compatible resin may be any water-soluble or water insoluble polymer which is used in the water-borne coating industry. Examples of polymers which are commonly used as the principal film-forming binder resin in latex or water-reducible coatings are acrylic, vinyl ester, polyurethane, polyester, epoxy and alkyd.

The organic medium present in the composition of the invention, in one embodiment, is a plastics material and in another embodiment an organic liquid. The organic liquid may be a polar organic liquid. By the term "polar," in relation to the organic liquid, it is meant that an organic liquid is capable of forming moderate to strong bonds as described in the article entitled "A Three Dimensional Approach to Solubility" by Crowley et al in Journal of Paint Technology, Vol. 38, 1966, at page 269. Such organic liquids generally have a hydrogen bonding number of 5 or more as defined in the abovementioned article.

Examples of suitable polar organic liquids are amines, ethers, especially lower alkyl ethers, organic acids, esters, ketones, glycols, glycol ethers, glycol esters, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

In one embodiment, polar organic liquids are dialkyl ketones, alkyl esters of alkane carboxylic acids and alkanols, especially such liquids containing up to, and including, a total of 6 carbon atoms. As examples of the polar organic liquids include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol (also known as 2-methylpropanol), terpineol and dialkyl and cyclic ethers such as diethyl ether and tetrahydrofuran. In one embodiment, solvents are alkanols, alkane carboxylic acids and esters of alkane carboxylic acids. In one embodiment, the present invention is suitable for organic liquids that are substantially non-soluble in an aqueous medium. Furthermore, a person skilled in the art will appreciate that small quantities of an aqueous medium (such as glycols, glycol ethers, glycol esters and alcohols) may be present in the organic liquids provided the overall organic liquid is substantially non-soluble in an aqueous medium.

Examples of organic liquids, which may be used as polar organic liquids are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermosetting acrylic/melamine-formaldehyde, long oil alkyd, medium oil alkyd, short oil alkyd, polyether polyols and multi-media resins such as acrylic and urea/aldehyde.

The organic liquid may be a polyol, that is to say, an organic liquid with two or more hydroxy groups. In one embodiment, polyols include alpha-omega diols or alpha-omega diol ethoxylates.

In one embodiment, the organic liquid comprises at least 0.1% by weight, or 1% by weight or more of a polar organic liquid based on the total organic liquid. The organic liquid optionally further comprises water. In one embodiment, the organic liquid is free of water (typically less than 2 wt % water, or less than 1 wt % water, or less than 0.5 wt % water, or less than 0.1 wt %).

The plastics material may be a thermosetting resin. The thermosetting resins useful in this invention include resins which undergo a chemical reaction when heated, catalyzed, or subject to ultra-violet, laser light, infra-red, cationic, electron beam, or microwave radiation and become relatively infusible. Typical reactions in thermosetting resins include oxidation of unsaturated double bonds, reactions involving epoxy/amine, epoxy/carbonyl, epoxy/hydroxyl, reaction of epoxy with a Lewis acid or Lewis base, polyisocyanate/hydroxy, amino resin/hydroxy moieties, free radical reactions or polyacrylate, cationic polymerization of epoxy resins and vinyl ether and condensation of silanol. Examples of unsaturated resins include polyester resins made by the reaction of one or more diacids or anhydrides with one or more diols. Such resins are commonly supplied as a mixture with a reactive monomer such as styrene or vinyltoluene and are often referred to as orthophthalic resins and isophthalic resins. Further examples include resins using dicyclopentadiene (DCPD) as a co-reactant in the polyester chain. Further examples also include the reaction products of bisphenol A diglycidyl ether with unsaturated carboxylic acids such as methacrylic acid, subsequently supplied as a solution in styrene, commonly referred to as vinyl ester resins.

In one embodiment, the thermosetting composite or thermosetting plastic may be a polyester, a polyvinyl acetate, a polyester resin in styrene, a polystyrene, or mixtures thereof.

Polymers with hydroxy functionality (frequently polyols) are widely used in thermosetting systems to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including both monomeric aliphatic diisocyanates, monomeric aromatic diisocyanates and their polymers. Typical aliphatic diisocyanates include hexamethylene diisocyanate, isophorone diisocyanate and hydrogenated diphenylmethane diisocyanate. Typical aromatic isocyanates include toluene diisocyanates and biphenylmethane diisocyanates.

If desired, the compositions of the present invention may contain other ingredients, for example resins (where these do not already constitute the organic medium), binders, co-solvents, cross-linking agents, fluidizing agents, wetting agents, anti-sedimentation agents, plasticizers, surfactants, dispersants other than the compound of the present invention, humectants, anti-foamers, anti-cratering agents, rheology modifiers, heat stabilizers, light stabilizers, UV absorbers, antioxidants, levelling agents, gloss modifiers, biocides and preservatives.

If desired, the compositions containing thermosetting plastic material may contain other ingredients, for example dispersants other than the compound of the present invention, blowing agents, flame retardants, process aids, surfactants, heat stabilizers, UV absorbers, anti-oxidants, fragrances, mold release aids, anti-static agents, anti-microbial agents, biocides, coupling agents, lubricants (external and internal), air release agents and viscosity depressants.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, in one embodiment, contains from 15 to 60% by weight of the solid whereas a composition in which the solid is an inorganic material, such as an inorganic pigment, filler or extender, in one embodiment, contains from 40 to 90% by weight of the solid based on the total weight of composition.

The compositions containing an organic liquid may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example by high speed mixing, ball milling, basket milling, bead milling, gravel milling, sand grinding, attritor grinding, two roll or three roll milling, plastic milling until the dispersion is formed. Alternatively, the solid may be treated to reduce its particle size independently or in admixture with either the organic medium or the dispersant, the other ingredient or ingredients then being added and the mixture being agitated to provide the composition. The composition can also be made by grinding or milling the dry solid with the dispersant and then adding the liquid medium or mixing the solid with the dispersant in a liquid medium in a pigment flushing process.

The composition containing the plastic material may be prepared by any of the conventional methods known for preparing thermoplastic compounds. Thus, the solid, the thermoplastic polymer, and the dispersant may be mixed in any order, the mixture then being subjected to a mechanical treatment to reduce the particles of the solid to an appropriate size, for example, by Banbury mixing, ribbon blending, twin-screw extrusion, twin-roll milling, compounding in a Buss co-kneader, or similar equipment.

The composition of the present invention is particularly suited to liquid dispersions. In one embodiment, such dispersion compositions comprise:
(a) from 0.5 to 80 parts of a particulate solid;
(b) from 0.1 to 79.6 parts of a polymer of Formula I; and
(c) from 19.9 to 99.4 parts of an organic liquid and/or water; wherein all relative parts are by weight and the amounts (a)+(b)+(c)=100.

In one embodiment, component a) comprises from 0.5 to 30 parts of a pigment and such dispersions are useful as (liquid) inks, coatings (paints), and millbases.

If a composition is required comprising a particulate solid and a dispersant of Formula I in dry form, the organic liquid is typically volatile so that it may be readily removed from the particulate solid by a simple separation means such as evaporation. In one embodiment, the composition comprises the organic liquid.

If the dry composition consists essentially of the dispersant of Formula I and the particulate solid, it typically contains at least 0.2%, at least 0.5% or at least 1.0% dispersant of Formula I based on weight of the particulate solid. In one embodiment, the dry composition contains not greater than 100%, not greater than 50%, not greater than 20% or not greater than 10% by weight of dispersant of Formula I based on the weight of the particulate solid.

As disclosed hereinbefore, the compositions of the invention are suitable for preparing millbases wherein the particulate solid is milled in an organic liquid in the presence of a compound for Formula I.

Thus, according to a still further aspect of the invention, there is provided a millbase comprising a particulate solid, an organic liquid and a polymer of Formula I.

Typically, the millbase contains from 20 to 70% by weight particulate solid based on the total weight of the millbase. In one embodiment, the particulate solid is not less than 10 or not less than 20% by weight of the millbase. Such millbases may optionally contain a binder added either before or after milling.

In one embodiment, the binder is a polymeric material capable of binding the composition on volatilization of the organic liquid.

Binders are polymeric materials including natural and synthetic materials. In one embodiment, binders include poly(meth)acrylates, polystyrenics, polyesters, polyurethanes, alkyds, polysaccharides such as cellulose, nitrocellulose, and natural proteins such as casein. The binder may be nitrocellulose. In one embodiment, the binder is present in the composition at more than 100% based on the amount of particulate solid, more than 200%, more than 300% or more than 400%.

The amount of optional binder in the millbase can vary over wide limits but is typically not less than 10%, and often not less than 20% by weight of the continuous/liquid phase of the millbase. In one embodiment, the amount of binder is not greater than 50% or not greater than 40% by weight of the continuous/liquid phase of the millbase.

The amount of dispersant in the millbase is dependent on the amount of particulate solid but is typically from 0.5 to 5% by weight of the millbase.

Dispersions and millbases made from the composition of the invention are particularly suitable for use in non-aqueous and solvent free formulations in which energy curable systems (ultra-violet, laser light, infra-red, cationic, electron beam, microwave) are employed with monomers, oligomers, etc. or a combination present in the formulation. They are particularly suitable for use in coatings such as paints, varnishes, inks, other coating materials and plastics. Suitable examples include their use in low, medium and high solids paints, general industrial paints including baking, two component and metal coating paints such as coil and can coatings, powder coatings, UV-curable coatings, wood varnishes; inks, such as flexographic, gravure, offset, lithographic, letterpress or relief, screen printing and printing inks for packaging printing, non-impact inks such as inkjet inks including continuous inkjet and drop on demand inkjet which include thermal, piezo and electrostatic, phase change inks and hot melt wax inks, inks for ink jet printers and print varnishes such as overprint varnishes; polyol and plastisol dispersions; non-aqueous ceramic processes, especially tape-casting, gel-casting, doctor-blade, extrusion and injection molding type processes, a further example would be in the preparation of dry ceramic powders for isostatic pressing; composites such as sheet molding and bulk molding compounds, resin transfer molding, pultrusion, hand-lay-up and spray-lay-up processes, matched die molding; construction materials like casting resins, cosmetics, personal care like nail coatings, sunscreens, adhesives, toners such as liquid toners, plastics materials and electronic materials such as coating formulations for color filter systems in displays including organic light-emitting diode (OLED) devices, liquid crystal displays and electrophoretic displays, glass coatings including optical fiber coatings, reflective coatings or anti-reflective coatings, conductive and magnetic inks and coatings. They are useful in the surface modification of pigments and fillers to improve the dispersibility of dry powders used in the above applications. Further examples of coating materials are given in Bodo Muller, Ulrich Poth, Lackformulierung und Lackrezeptur, Lehrbuch fr Ausbildung und Praxis, Vincentz Verlag, Hanover (2003) and in P. G. Garrat, Strahlenhartung, Vincentz Verlag, Hanover (1996). Examples of printing ink formulations are given in E. W. Flick, Printing Ink and Overprint Varnish Formulations—Recent Developments, Noyes Publications, Park Ridge NJ, (1990) and subsequent editions.

Dispersions and millbases made from the composition of the invention are also useful for contact and non-contact (drop on demand) aqueous printing processes such as aqueous flexo, aqueous inkjet, aqueous UV inkjet.

In one embodiment, the composition of the invention further includes one or more additional known dispersants.

The following examples provide illustrations of the invention. These examples are non-exhaustive and are not intended to limit the scope of the invention.

EXAMPLES

Comparative Example 1 (CE1)—Polyether Amine Reacted with Tetrachlorophthalic Anhydride.

A dispersant was prepared according to Example 3 in WO Patent publication 2015/031043 except Surfonamine® B200 replaces Surfonamine® L207. Tetrachlorophthalic anhydride (2.72 parts) and polyether amine (20.00 parts, Surfonamine® B200, MW: 2000, ex Huntsman) were stirred under a nitrogen atmosphere for 6 hours at 120° C. until no anhydride remained as determined by IR spectroscopy. The resulting product had an acid value less than 2.0 mgKOH/g and the presence of imide peak at 1721.3 $cm^{-1}$.

Comparative Example 2 (CE2)—Polyether Amine Reacted with 3-Nitro-1,8-Naphthalic Anhydride A dispersant was prepared according to Example 1 in WO Patent publication 2013/165770. 3-Nitro-1,8-naphthalic anhydride (9.99 parts) was added to a stirred polyether amine (85.98 parts, Surfonamine® L207, MW: 2000, ex Huntsman) at 70° C. under nitrogen atmosphere. The reaction was heated at 150° C. for 5 hours until no anhydride remained as determined by IR spectroscopy. The resulting product had an amine value less than 0.23 mgKOH/g and the presence of an imide peak at 1669.5 cm$^{-1}$.

Example 1 (EX1)—Polyether Amine Reacted with Butyl Acrylate then Tetrachlorophthalic Anhydride Polyether amine (20.00 Parts, Surfonamine® B200, MW: 2000, ex Huntsman) and 3,5-di-tert-4-butylhydroxytoluene (0.1 parts) were stirred at 50° C. under air atmosphere. To this mixture, butyl acrylate (1.28 parts) was added dropwise over 15 mins after which the reaction was heated at 80° C. for 3 hours until no vinyl groups remained as determined by the $^1$H NMR spectroscopy. The temperature was then reduced to 50° C. after which tetrachlorophthalic anhydride (2.72 parts) was added under nitrogen atmosphere. The reaction mixture was stirred until the anhydride completely dissolved and then it was heated for a further 3 hours until no anhydride remained as determined by IR spectroscopy. The resulting product had an acid value of 30.13 mgKOH/g and the presence of a tertiary amide carbonyl peak at 1676 cm$^{-1}$.

Example 2 (EX2)—Polyether Amine Reacted with 2-Carboxyethyl Acrylate then 2,3-Naphthalic Anhydride Polyether amine (40.00 Parts, Surfonamine® L207, MW: 2000, ex Huntsman) and 3,5-di-tert-4-butylhydroxytoluene (0.01 parts) were stirred at 50° C. under air atmosphere. To this mixture, 2-carboxyethyl acrylate (2.88 parts) was added dropwise over 5 mins and held at 50° C. for 3 hours and then 80° C. for 2 hours until no vinyl groups remained as determined by $^1$H NMR spectroscopy. The temperature was then reduced to 50° C. after which 2,3-naphthalic anhydride (3.96 parts) was added under a nitrogen atmosphere. The reaction mixture was stirred until the anhydride completely dissolved and then it was heated for a further 24 hours until no anhydride remained as determined by IR spectroscopy. The resulting product had an acid value of 50.22 mgKOH/g and the presence of a tertiary amide carbonyl peak at 1636 cm$^{-1}$.

Dispersion Test 1—Preparation of Organic Red Dispersion.

Dispersions were prepared by dissolving dispersants CE1 and EX1 (0.4 parts) into 1-methoxy-2-propyl acetate (6.5 parts). To this was added 3 mm glass beads (18 parts) and red pigment (Irgalite® Rubine 4BP, 2.0 parts, ex BASF) and the contents were milled on a horizontal shaker for 16 hours. The resulting dispersion produced from EX1 was fluid with a low particle size (D50) of 216 nm as determined by a Microtac Nano™ 250 particle size analyser. The dispersion remained fluid for 1 week at 50° C. indicating excellent dispersion stability. The resulting dispersion from CE1 resulted in a flocculated dispersion with high particle size (D50) 1767 nm and was not stable at 50° C. resulting in a gel, indicating poor dispersion stability.

Dispersion Test 2—Preparation of Organic Red Dispersion

Dispersions were prepared by dissolving dispersants CE1 and EX1 (5.12 parts) into dipropyleneglycol diacrylate (49.28 parts, Photomer® 4226 ex IGM Resins). To this was added 3 mm glass beads (250 parts) and red pigment (25.60 parts, Symuler® Carmine 6B 401 ex SunChemical®) and the contents were milled on a Scandex shaker for 2 hours. The resulting dispersion produced from EX1 was fluid with a low particle size (D50) of 378 nm as determined by a Microtac Nano™ 250 particle size analyser. The dispersion from CE1 resulting in a gel with high particle size.

Ink Formulation from Dispersion Test 2

The resulting dispersion from Ex1 (12.5 parts) was let down into a polyester acrylate oligomer (15.00 parts, CN2505 ex Sartomer) with a photoinitiator blend comprising photoinitiator (0.75 parts, Irgacure 379 ex Sartomer), photoinitiator (0.25 parts Speedcure ITX ex Lambson), benzophenone (0.75 parts) and amine synergist (0.75 parts Speedcure EDB ex Lambson). The resulting ink was drawn down onto Black & White card using a 400/5 K-Lox Proofer and passed through UV curer 3 times at speed 500 m/min using a 300 w/inch lamp. The resulting coating had high good color strength with 20° gloss equal to 76.90 and 600 gloss equal to 111.7 as determined using a Byk-Gardner Gloss Haze meter. CE1 was too viscous to letdown into this resin system.

Dispersion Test 2 was repeated using a commercially available dispersant, Solsperse™ 39000, as a comparative example achieving lower gloss with 200 gloss equal to 54.80 and 60° gloss equal to 94.70. A 24% higher color strength was produced by EX1 compared to Solsperse™ 39000.

Dispersion Test 3—Preparation of Iron Oxide Yellow Dispersion.

Dispersions were prepared by dissolving dispersants CE2 and EX2 (0.22 parts) into water (2.93 parts). To this mixture was added humectant (0.27 parts, Humectant® GRB3 ex Lubrizol), 3 mm glass beads and yellow pigment (5.58 parts Bayferrox® yellow 3920 ex BASF) and the contents were milled on a horizontal shaker for 16 hours. The resulting dispersion from EX2 was very fluid whereas the resulting dispersion from CE2 was a highly viscous gel.

Comparative Example 3 (CE3)—Polyether Amine Reacted with Phthalic Anhydride

A dispersant was prepared according to Example 1 in WO Patent publication 2013/165770. Phthalic anhydride (7.61 parts) was added to a stirred polyether amine (50.55 parts, Surfonamine® L100, MW: 1000, ex Huntsman) at 70° C. under nitrogen atmosphere. The reaction was heated at 150° C. for 6 hours until no anhydride remained as determined by IR spectroscopy. The resulting product had an amine value of 0 mgKOH/g and the presence of an imide peak at 1705 cm$^{-1}$.

Comparative Example 4 (CE4)—Polyether Amine Reacted with Phthalic Anhydride

A dispersant was prepared according to Example 1 in WO Patent publication 2013/165770. Phthalic anhydride (5.94 parts) was added to a stirred polyether amine (82.18 parts, Surfonamine® L207, MW: 2000, ex Huntsman) at 70° C. under nitrogen atmosphere. The reaction was heated at 150° C. for 6 hours until no anhydride remained as determined by IR spectroscopy. The resulting product had an amine value of 0 mgKOH/g and the presence of an imide peak at 1714 cm$^{-1}$.

Example 3 (EX3)—Polyether Amine Reacted with Acrylic Acid then Phthalic Anhydride Polyether amine (100.73 parts, Surfonamine® L100, MW 1000, ex Huntsman) and 3,5-di-tert-4-butylhydroxytoluene (0.36 parts) were stirred at 50° C. under air atmosphere. To this mixture, acrylic acid (7.26 parts) was added dropwise over 20 minutes after which the reaction was heated at 80° C. for 3 hours until no vinyl groups remained as determined by the $^1$H NMR spectroscopy. The temperature was then reduced to 50° C. after which phthalic anhydride (14.76 parts) was added under nitrogen atmosphere. The reaction mixture was stirred until the anhydride completely dissolved and then it was heated for further 3 hours until no anhydride remained as determined by IR spectroscopy. The resulting product had an acid value of 94.91 mgKOH/g and the presence of a tertiary amide carbonyl peak at 1635 cm$^{-1}$.

Example 4 (EX4)—Polyether Amine Reacted with Butyl Acrylate Acid then Phthalic Anhydride Polyether amine (40.0 parts, Surfonamine® L207, MW 2000, ex Huntsman) and 3,5-di-tert-4-butylhydroxytoluene (0.2 parts) were stirred at 50° C. under air atmosphere. To this mixture, butyl acrylate (2.32 parts) was added dropwise over 20 minutes after which the reaction was heated at 80° C. for 3 hours until no vinyl groups remained as determined by the $^1$H NMR spectroscopy. The temperature was then reduced to 50° C. after which phthalic anhydride (2.81 parts) was added under nitrogen atmosphere. The reaction mixture was stirred until the anhydride completely dissolved and then it was heated for further 3 hours until no anhydride remained as determined by IR spectroscopy. The resulting product had an acid value of 25.12 mgKOH/g and the presence of a tertiary amide carbonyl peak at 1709 cm$^{-1}$.

Example 5 Intermediate (INTM5)—Polyether Amine Reacted with 2-Carboxyethyl Acrylate Polyether amine (203.69 parts, Surfonamine® L207, MW 2000, ex Huntsman) and 3,5-di-tert-4-butylhydroxytoluene (0.66 parts) were stirred at 50° C. under air atmosphere. To this mixture, 2-carboxyethyl acrylate (14.47 parts) was added dropwise over 10 minutes after which the reaction was heated at 80° C. for 3 hours until no vinyl groups remained as determined by the $^1$H NMR spectroscopy. The resulting intermediate had the amine value of 26.88 mgKOH/g.

Example 5 Dispersant (EX5)—Example 5 Intermediate Reacted with Pyromellitic Dianhydride Pyromellitic dianhydride (2.16 parts) was added to a stirred Example 5 intermediate (41.82 parts) at 50° C. under nitrogen atmosphere. The temperature was then reduced to 50° C. after which phthalic anhydride (2.81 parts) was added under nitrogen atmosphere. The reaction mixture was stirred until the anhydride completely dissolved and then it was heated for further 3 hours until no anhydride remained as determined by IR spectroscopy. The resulting product had an acid value of 51.84 mgKOH/g and the presence of a tertiary amide carbonyl peak at 1636 cm$^{-1}$.

Example 6 (EX6)—Polyether Amine Reacted with Poly(Ethylene Glycol) Methyl Ether Acrylate then Phthalic Anhydride Polyether amine (104.64 parts, Surfonamine® L100, MW 1000, ex Huntsman) and 3,5-di-tert-4-butylhydroxytoluene (0.51 parts) were stirred at 50° C. under air atmosphere. To this mixture, poly(ethylene glycol) methyl ether acrylate (2.32 parts, MW 480) was added dropwise over 50 minutes after which the reaction was heated at 80° C. for 3 hours until no vinyl groups remained as determined by the 1H NMR spectroscopy. The temperature was then reduced to 50° C. after which phthalic anhydride (14.58 parts) was added under nitrogen atmosphere. The reaction mixture was stirred until the anhydride completely dissolved and then it was heated for overall 10 hours until no anhydride remained as determined by IR spectroscopy. The resulting product had an acid value of 33.95 mgKOH/g and the presence of a tertiary amide carbonyl peak at 1663 cm$^{-1}$.

Example 7 (EX7)—Poly(Ethylene Glycol) Methyl Ether Acrylate Reacted with Octylamine then Phthalic Anhydride Poly(ethylene glycol) methyl ether acrylate (96.26 parts, MW 480) and 3,5-di-tert-4-butylhydroxytoluene (0.52 parts) were stirred at 50° C. under air atmosphere. To this mixture, octylamine (26.06 parts, MW 480) was added dropwise over 25 minutes after which the reaction was heated at 80° C. for 3 hours until no vinyl groups remained as determined by the 1H NMR spectroscopy. The temperature was then reduced to 50° C. after which phthalic anhydride (29.72 parts) was added under nitrogen atmosphere. The reaction mixture was stirred until the anhydride completely dissolved and then it was heated for overall 10 hours until no anhydride remained as determined by IR spectroscopy. The resulting product had an acid value of 76.32 mgKOH/g and the presence of a tertiary amide carbonyl peak at 1639 cm$^{-1}$.

Example 8 (EX8)—Polyether Amine Reacted with 1,2-Epoxy-3-Phenoxypropane then 2,3-Naphthalenedicarboxylic Anhydride Polyether amine (53.92 parts, Surfonamine® L207, MW 2000, ex Huntsman) was stirred at room temperature under air atmosphere. To this 1,2-epoxy-3-phenoxypropane (3.81 parts) was added dropwise over 20 minutes after which the reaction was heated at 50° C. for 3 hours until no epoxide group remained as determined by the 1H NMR spectroscopy. 2,3-Naphthalenedicarboxylic anhydride (5.03 parts) was added under nitrogen atmosphere and the reaction mixture stirred for further 10 hours until no anhydride remained as determined by IR spectroscopy. The resulting product had an acid value of 19.15 mgKOH/g and the presence of a tertiary amide carbonyl peak at 1664 cm$^{-1}$.

Example 9 (EX9)—Polyether Amine Reacted with Butyl Acrylate then Tetrachlorophthalic Anhydride Polyether amine (506.05 parts, Surfonamine® B200, MW 2000, ex Huntsman) and 3,5-di-tert-4-butylhydroxytoluene (1.69 parts) were stirred at 50° C. under air atmosphere. To this mixture, butyl acrylate (26.64 parts) was added dropwise over 15 minutes after which the reaction was heated at 80° C. for 17 hours until no vinyl groups remained as determined by the 1H NMR spectroscopy. The temperature was then reduced to 50° C. after which tetrachlorophthalic anhydride (58.13 parts) was added under nitrogen atmosphere. The reaction mixture was stirred until the anhydride completely dissolved and then it was heated for further 18 hours until no anhydride remained as determined by IR spectroscopy. The resulting product had an acid value of 28.77 mgKOH/g and the presence of a tertiary amide carbonyl peak at 1676 cm$^{-1}$.

Example 10 (EX10)—Polyether Amine Reacted with 2-Phenoxyethylacrylate then Tetrachlorophthalic Anhydride Polyether amine (121.35 parts, Surfonamine® B200, MW 2000, ex Huntsman) and 3,5-di-tert-4-butylhydroxytoluene (0.36 parts) were stirred at 50° C. under air atmosphere. To this mixture, 2-phenoxyethylacrylate (9.62 parts) was added dropwise over 15 minutes after which the reaction was heated at 80° C. for 6 hours until no vinyl groups remained as determined by the 1H NMR spectroscopy. The temperature was then reduced to 50° C. after which tetrachlorophthalic anhydride (14.30 parts) was added under nitrogen atmosphere. The reaction mixture was stirred for 18 hours until no anhydride remained as determined by IR spectroscopy. The resulting product had an acid value of 26.45 mgKOH/g and the presence of a tertiary amide carbonyl peak at 1674 cm$^{-1}$.

Example 11 (EX11)—Polyether Amine Reacted with Butyl Acrylate then Phthalic Anhydride Polyether amine (244.30 parts, derived from a C12-15 alcohol reacted with butylene oxide followed by base catalyzed addition of the resultant polyether alcohol to acrylonitrile and subsequent hydrogenation to give an amine (80% active), MW 1700) and 3,5-di-tert-4-butylhydroxytoluene (0.90 parts) were stirred at 50° C. under air atmosphere. To this mixture, butyl acrylate (12.89 parts) was added dropwise over 50 minutes after which the reaction was heated at 80° C. for 4 hours until no vinyl groups remained as determined by the 1H NMR spectroscopy. The temperature was then reduced to 50° C. after which phthalic anhydride (14.80 parts) was added under nitrogen atmosphere. The reaction mixture was stirred for 18 hours until no anhydride remained as determined by IR spectroscopy. The resulting product had an acid value of 21.82 mgKOH/g and the presence of a tertiary amide carbonyl peak at 1648 cm$^{-1}$.

Example 12 (EX12)—Polyether Amine Reacted with N,N-Dimethylacrylamide then Tetrachlorophthalic Anhydride Polyether amine (121.48 parts, Surfonamine B200@, MW 2000, ex Huntsman) and 3,5-di-tert-4-butylhydroxytoluene (0.40 parts) were stirred at 50° C. under air atmosphere. To this mixture, N,N-dimethylacrylamide (4.97 parts) was added dropwise over 15 minutes after which the reaction was heated at 80° C. for 6 hours until no vinyl groups remained as determined by the 1H NMR spectroscopy. The temperature was then reduced to 50° C. after which tetrachlorophthalic anhydride (14.37 parts) was added under nitrogen atmosphere. The reaction mixture was stirred for 18 hours until no anhydride remained as determined by IR spectroscopy. The resulting product had an acid value of 26.28 mgKOH/g and the presence of a tertiary amide carbonyl peak at 1675 cm$^{-1}$.

Example 13 (EX13)—Polyether Amine Reacted with 2-(Dimethylamino)Ethylacrylate then Phthalic Anhydride Polyether amine (213.30 parts, Surfonamine L207@, MW 2000, ex Huntsman) and 3,5-di-tert-4-butylhydroxytoluene (0.62 parts) were stirred at 50° C. under air atmosphere. To this mixture, 2-(dimethylamino)ethylacrylate (14.40 parts) was added dropwise over 15 minutes after which the reaction was heated at 80° C. for 4 hours until no vinyl groups remained as determined by the 1H NMR spectroscopy. The temperature was then reduced to 50° C. after which phthalic anhydride (14.65 parts) was added under nitrogen atmosphere. The reaction mixture was stirred for 18 hours until no anhydride remained as determined by IR spectroscopy. The resulting product had an acid value of 22.30 mgKOH/g and the presence of a tertiary amide carbonyl peak at 1661 cm$^{-1}$.

Dispersion Test 4—Preparation of Organic Red Dispersion

Dispersions were prepared by dissolving dispersants, comparative examples (CE), and/or examples (EX) (0.4 parts) into 1-methoxy-2-propyl acetate (7.6 parts). To this was added 3 mm glass beads (17 parts), red pigment (2 parts, Irgalite® Rubine 4BP ex BASF) and the contents were milled on a horizontal shaker for 16 hours. The particle sizes (D50 and D90) of the resulting dispersions were determined by a Microtrac DLS Nano-flex particle size analyser. The resulting mill bases from Examples 4,6 to 13 were fluid and remained fluid on standing at room temperature. The mill bases from comparative examples 1,3,4 were viscous and gelled on standing at room temperature.

TABLE 1

D50 and D90 Particle Sizes from Dispersing Test 4

| Sample | D50/nm | D90/nm |
|---|---|---|
| Comparative example 1 | 1179 | 2402 |
| Comparative example 3 | 1280 | 2688 |
| Comparative example 4 | 839 | 2379 |
| Example 4 | 519 | 875 |
| Example 6 | 314 | 434 |
| Example 7 | 502 | 675 |
| Example 8 | 252 | 625 |
| Example 9 | 484 | 692 |
| Example 10 | 400 | 540 |
| Example 11 | 307 | 468 |
| Example 12 | 340 | 455 |
| Example 13 | 189.5 | 353 |

Dispersion Test 5—Preparation of Iron Oxide Yellow Dispersion

Dispersions were prepared by dissolving dispersants, comparative examples (CE), and/or examples (EX) (0.22 parts) into water (2.93 parts). To this mixture was added humectant (1.27 parts, Humectant® GRB3 ex Lubrizol), 3 mm glass beads and yellow pigment (5.58 parts, Bayferrox® yellow 3920 ex BASF) and the contents were milled on a horizontal shaker for 16 hours. The particle sizes (D50 and D90) of the resulting dispersions were determined by a Microtrac DLS Nano-flex particle size analyser. Examples 2,3 and 5 were fluid and remained fluid on standing at room temperature whereas comparative example 3 formed a highly viscous gel.

TABLE 2

Viscosity and D50 and D90 for Dispersion Test 5

| Sample | Viscosity | D50 | D90 |
|---|---|---|---|
| Comparative example 3 | Highly viscous gel | Too viscous to measure | Too viscous to measure |
| Example 2 | Fluid | 379 | 875 |
| Example 3 | Fluid | 428 | 638 |
| Example 5 | Fluid | 412 | 658 |

As described hereinafter, the number average molecular weight of the polymer of the present invention has been determined using known methods, such as Gel Permeation Chromatography (GPC) analysis using a polystyrene standard for all polymer chains.

Each of the documents referred to above is incorporated herein by reference. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A dispersant or its salts comprising a polymer having the following structure, or salts thereof:

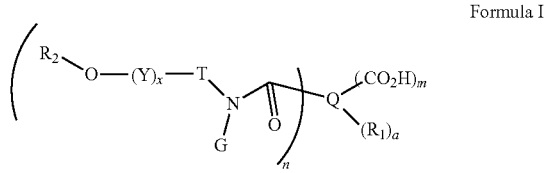

Formula I n is 1, and m is equal to n in each polymer;
$R_1$ is independently CN, $NO_2$, Cl, Br, $CH_3$, $NH_2$ or OH where a is 0 to 4;
$R_2$ is H, a $C_{1-50}$ optionally substituted hydrocarbyl, or a $C_{1-50}$ optionally substituted hydrocarbonyl group;
G is a $C_{1-50}$ hydrocarbyl group optionally substituted with heteroatoms represented as ether, ester, aldehyde, ketone, amide, urethane, alcohol or carboxylic acid groups, or a residue of an optionally substituted alkyl (meth)acrylate or (meth)acrylamide, or a ring opening product of an epoxide of the formula

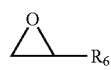

wherein $R_6$ can individually on each occurrence be H or $CH_3$ or $C_2H_5$ or one of the following groups:

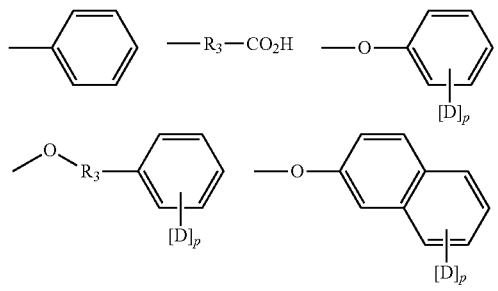

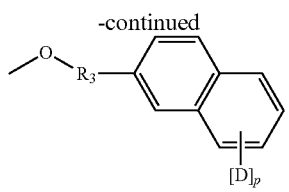

wherein D is $C_{1-5}$ alkyl group, CN, OH, $NO_2$, $NH_2$, halogen, $CO_2H$, $SO_3H$, $CH_3$ or $OCH_3$;
p is from 0 to 4;
$R_3$ is a linear or branched $C_{1-50}$;
T is —C(O)—CH($R_4$)$CH_2$ or $C_{1-5}$ hydrocarbyl chain;
when G is $C_{1-50}$ hydrocarbyl, T is —C(O)—CH($R_4$)$CH_2$;
when G is a residue of an optionally substituted alkyl (meth)acrylate or (meth)acrylamide, or a ring opening product of an epoxide, T is $C_{1-5}$ hydrocarbyl chain;
$R_4$ is H or Me;
Y independently in each repeat unit is $C_{2-4}$ alkyleneoxy;
Q comprises a naphthalene, a biphenyl, or a phenyl, wherein the carboxylic acid group attached to Q is attached to a carbon atom of the aromatic ring of Q;
wherein the hydrogen of any acid in Formula I is optionally replaced by a metal, amine, or ammonium cation to place the dispersant in the form of a salt; and
x is 2 to 90.

2. The dispersant of claim 1, wherein the dispersant is obtained by a process comprising:
Step (1): reacting a Michael acceptor with a nitrogen atom of a nucleophilic polymeric chain, forming a polyether functionalized secondary amine; and
Step (2): reacting said polyether functionalized secondary amine with an aromatic di-acid or anhydride thereof to form a tertiary amide connecting group between said aromatic acid and said polyether.

3. The dispersant of claim 2, wherein said Step (1) is conducted at a temperature from about 0° C. to 150° C., and said Step (2) is carried out at a temperature from about 0° C. to 120° C.

4. The dispersant of claim 1, wherein the dispersant is obtained by a process comprising:
Step (1): reacting a (meth)acrylate or functionalized (meth)acrylate monomer having an unsaturated acrylate functionality with a nucleophilic aliphatic amine, forming a monofunctional poly(ethylene glycol) ("MPEG") functionalized secondary amine; and
Step (2): reacting said MPEG functionalized secondary amine with an aromatic di-acid or tetra-acid or anhydride thereof, to form a tertiary amide linkage from one of the acid groups of said aromatic di-acid or tetra-acid or anhydride thereof, connecting said MPEG functionalized secondary amine to said aromatic di-acid or tetra-acid or anhydride thereof, now an acid/amide;
wherein said Step (1) is carried out at a temperature from about 0° C. to 150° C.; wherein said Step (2) is carried out at a temperature of from about 0° C. to 120° C.

5. The dispersant of claim 1, wherein the dispersant is obtained by a process comprising:
Step (1): reacting a hydroxyl acrylate with a nucleophilic aliphatic amine, forming an aliphatic secondary amine;
Step (2): reacting said aliphatic secondary amine with an aromatic di-acid or tetra-acid or anhydride thereof forming a tertiary amide; and
Step (3): optionally reacting a hydroxyl of said aliphatic secondary amine with an epoxide or cyclic ester, wherein said cyclic ester is optionally caprolactone, and/or polymerising said epoxide or cyclic ester to form a polymeric polyether chain or polyester chain; wherein said Step (1) is carried out at a temperature from about 0° C. to 150° C.; wherein said Step (2) is carried out from a temperature from about 0° C. to 120° C.; and wherein said Step (3), if performed, is carried out at a temperature from about 100° C. to 200° C.

6. The dispersant claim 1, wherein said dispersant is according to at least one of the following:

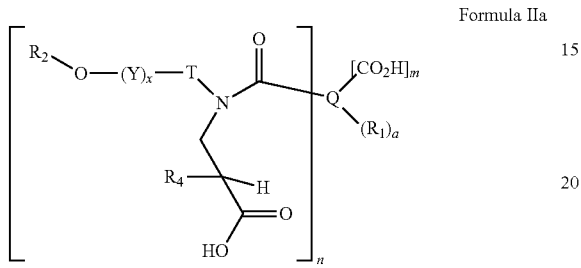

Formula IIa

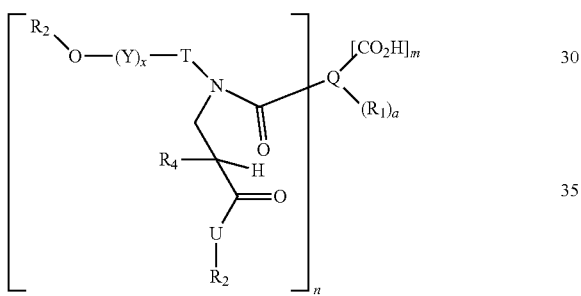

Formula IIb

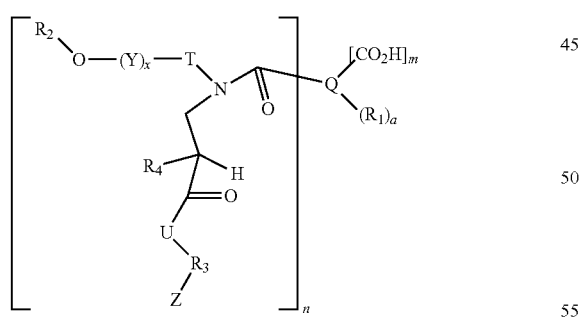

Formula IIc wherein the variables in Formulae IIa to IIc are as defined in claim 1, the hydrogen of any acid in any of Formulate IIa to IIc is optionally replaced by a metal, amine, or ammonium cation to place the dispersant in the form of a salt; and wherein U is O or NH and Z is —OH, —N(R$_7$)$_2$, C$_{3-6}$ cycloalkyl group, a 5, 6 or 7 atom heterocycle of carbon and oxygen and/or nitrogen; or acid; wherein R$_7$ is a C$_{1-5}$ alkyl group.

7. The dispersant of claim 1, wherein said dispersant is according to:

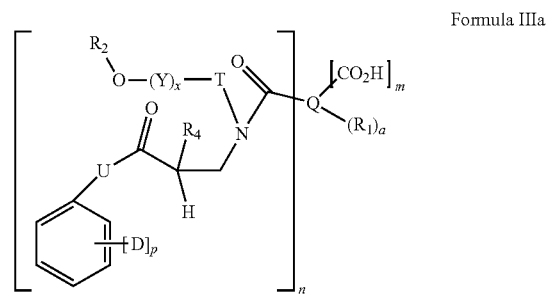

Formula IIIa wherein the variables in Formula IIIa are as defined in claim 1;

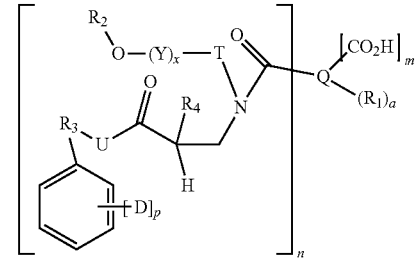

Formula IIIb wherein the variables in Formula IIIb are as defined in claim 1; and
wherein the hydrogen of any acid in Formula IIIa or Formula IIIb is optionally replaced by a metal, amine, or ammonium cation to place the dispersant in the form of a salt and wherein U is O or NH.

8. The dispersant of claim 1, wherein said dispersant is according to:

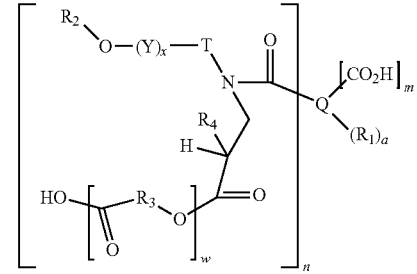

Formula IVa

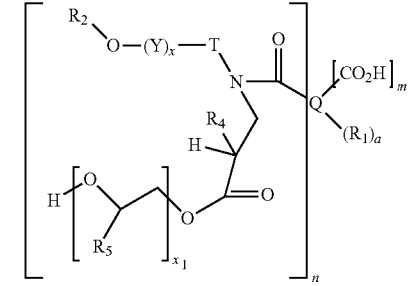

Formula IVb wherein the variables in Formulae IVa to IVb are as defined in claim 1, R$_5$ is H or a methyl, ethyl, propyl, butyl, or phenyl group, and w is 1 to 20; wherein the hydrogen of any acid in Formula IVa or Formula IVb is optionally replaced by a metal, amine, or ammonium cation to place the dispersant in the form of a salt; and wherein xi is from 1 to 20.

9. The dispersant of claim 1, wherein said dispersant is according to:

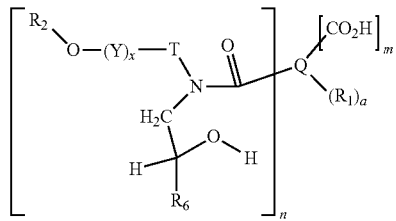

Formula V where the variables in Formula V are as defined in claim 1, except for $R_6$ which for Formula V is $R_2$, an optionally substituted benzene ring, a $R_3$—$CO_2H$ group, an ether linkage to an optionally substituted benzene ring, or an ether linkage to an optionally substituted naphthalene; and wherein the hydrogen of any acid in Formula V is optionally replaced by a metal, amine, or ammonium cation to place the dispersant in the form of a salt.

10. A composition comprising a particulate solid, an aqueous medium or a polar organic solvent medium, and a dispersant according to claim 1.

11. The composition of claim 10, wherein the medium comprises an aqueous medium.

12. The composition of claim 10, wherein the medium comprises a polar organic medium.

13. The composition of claim 10, wherein the composition is a millbase, paint or ink.

14. The composition of claim 10, wherein the particulate solid is a pigment or a filler.

15. The composition of claim 10, further comprising a binder.

16. The composition of claim 10, wherein the dispersant is present in an amount ranging from 0.1 wt % to 79.6 wt %, based on the total composition weight.

17. The composition of claim 10, wherein the dispersant is present in an amount ranging from 0.5 wt % to 30 wt %, based on the total composition weight.

* * * * *